US010332382B2

(12) United States Patent
Thyroff

(10) Patent No.: US 10,332,382 B2
(45) Date of Patent: Jun. 25, 2019

(54) SYSTEM AND METHOD FOR MONITORING HANDWASHING COMPLIANCE INCLUDING SOAP DISPENSER WITH INTEGRAL HAND-WASHING MONITOR AND SMART BUTTON SYSTEM

(71) Applicant: Hand-Scan, LLC, Pittsford, NY (US)

(72) Inventor: Louis Thyroff, Pittsford, NY (US)

(73) Assignee: Hand-Scan, LLC, Pittsford, NY (US)

( * ) Notice: Subject to any disclaimer, the term of this patent is extended or adjusted under 35 U.S.C. 154(b) by 66 days.

(21) Appl. No.: 15/729,204

(22) Filed: Oct. 10, 2017

(65) Prior Publication Data

US 2018/0047277 A1 Feb. 15, 2018

Related U.S. Application Data

(63) Continuation-in-part of application No. 15/443,081, filed on Feb. 27, 2017.

(Continued)

(51) Int. Cl.

| | |
|---|---|
| ***G08B 21/24*** | (2006.01) |
| *G10L 17/00* | (2013.01) |
| *G10L 17/22* | (2013.01) |

(52) U.S. Cl.

CPC ........... *G08B 21/245* (2013.01); *G08B 21/24* (2013.01); *G10L 17/005* (2013.01); *G10L 17/22* (2013.01)

(58) Field of Classification Search

CPC ...... G08B 21/00; G08B 21/18; G08B 21/182; G08B 21/24; G08B 21/245; A61B 5/0261; G06F 19/3418; G05D 1/0242

See application file for complete search history.

(56) References Cited

U.S. PATENT DOCUMENTS

| | | |
|---|---|---|
| 5,812,059 A | 9/1998 | Shaw et al. |
| 5,966,753 A | 10/1999 | Gauthier et al. |

(Continued)

FOREIGN PATENT DOCUMENTS

| | | |
|---|---|---|
| WO | WO2014035308 A1 | 3/2014 |
| WO | WO2015055971 A1 | 4/2015 |

OTHER PUBLICATIONS

International Search Report and Written Opinion relating to International Application No. PCT/US/2017/055893 dated Apr. 26, 2018.

(Continued)

*Primary Examiner* — Van T Trieu

(74) *Attorney, Agent, or Firm* — Dinsmore & Shohl, LLP

(57) ABSTRACT

A hand-washing monitor and hand washing monitoring system are provided. The hand-washing monitoring system includes a motion detector mounted near, to or in a sink and configured to detect a scrubbing motion near an outlet of a sink faucet and a user wearable smart button device that interacts with the motion detector. The system includes a processor coupled to the motion detector and smart button device and a memory coupled to the processor. The processor is configured to monitor the motion detector for signals indicative of the scrubbing motion that is continuous during a predetermined scrubbing interval and to provide signal indicating a successful scrubbing operation when the scrubbing motion is continuously detected during the entire interval to the smart button device. The hand-washing monitor includes a housing containing the processor, the motion detector, the memory and proximity sensors for detecting the application of soap.

28 Claims, 18 Drawing Sheets

Related U.S. Application Data

(60) Provisional application No. 62/406,492, filed on Oct. 11, 2016, provisional application No. 62/320,056, filed on Apr. 8, 2016.

(56) References Cited

U.S. PATENT DOCUMENTS

| | | | | |
|---|---|---|---|---|
| 5,979,500 | A | 11/1999 | Jahrling et al. | |
| 6,125,482 | A | 10/2000 | Foster | |
| 7,053,029 | B2 * | 5/2006 | MacDonald | A61K 8/368 510/130 |
| 7,551,092 | B1 | 6/2009 | Henry | |
| 7,804,409 | B2 | 9/2010 | Munro et al. | |
| 8,400,309 | B2 | 3/2013 | Glenn et al. | |
| 8,525,666 | B2 | 9/2013 | Melker et al. | |
| 9,013,312 | B2 | 4/2015 | Bolling | |
| 9,030,325 | B2 | 5/2015 | Taneff | |
| 9,715,817 | B2 | 7/2017 | Wildman et al. | |
| 2001/0018654 | A1 | 8/2001 | Hon et al. | |
| 2007/0020212 | A1 | 1/2007 | Bernal et al. | |
| 2008/0109956 | A1 | 5/2008 | Bayley et al. | |
| 2008/0271238 | A1 | 11/2008 | Reeder et al. | |
| 2013/0027199 | A1 | 1/2013 | Bonner | |
| 2014/0242562 | A1 | 8/2014 | McSterling et al. | |
| 2015/0161874 | A1 | 6/2015 | Thyroff et al. | |
| 2016/0314683 | A1 | 10/2016 | Felch et al. | |

OTHER PUBLICATIONS

Final Office Action pertaining to U.S. Appl. No. 15/443,081, dated Jun. 22, 2018.

Non-Final Office Action dated Feb. 1, 2018 filed in U.S. Appl. No. 15/443,081.

Claire Swedberg, "Technologies Solutions Group Markets RFID Hand-Hygiene Compliance System", http://www.rfidjournal.com/articles/view?11725, Published/accessed date: Apr. 25, 2014.

* cited by examiner

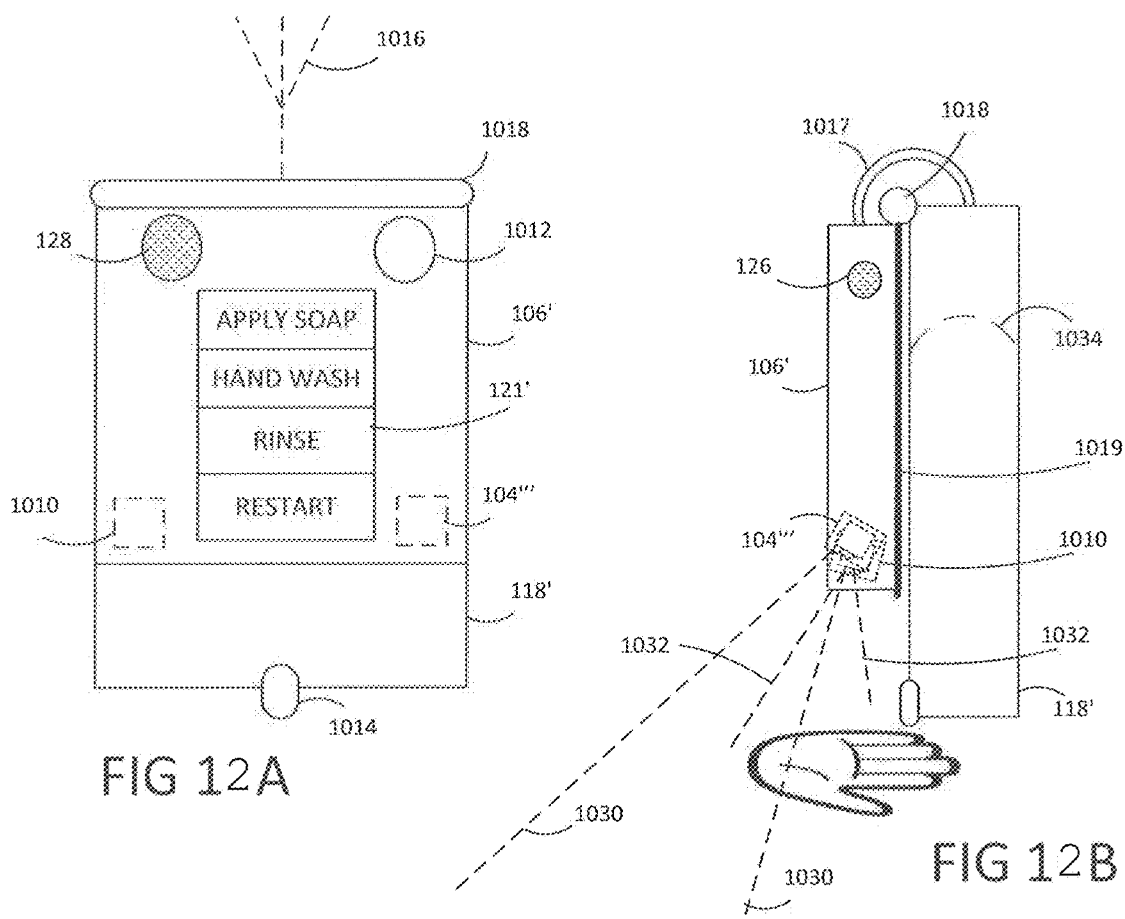
1016
1018
128
1012
APPLY SOAP
HAND WASH
RINSE
RESTART
106'
121'
1010
104'''
118'
1014
FIG 12A
1017
1018
126
1034
106'
1019
104'''
1010
1032
1032
118'
1030
1030
FIG 12B
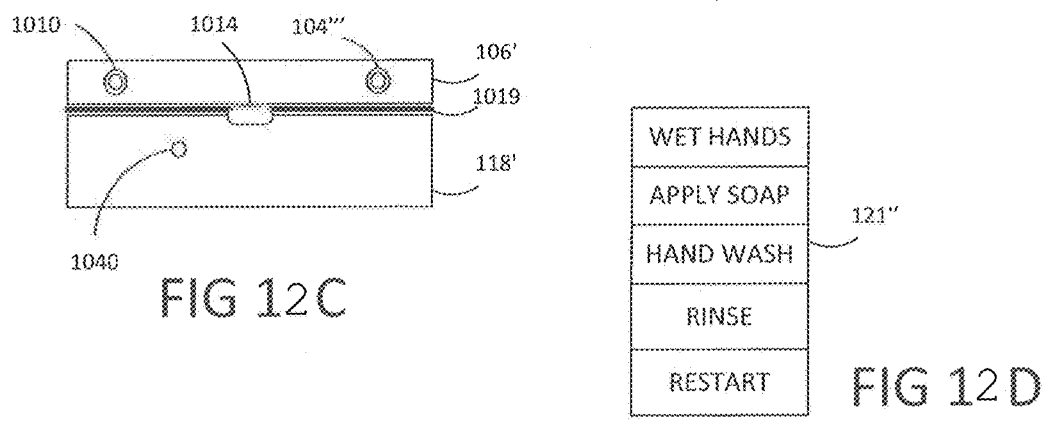
1010
1014
104'''
106'
1019
118'
1040
FIG 12C
WET HANDS
APPLY SOAP
HAND WASH
RINSE
RESTART
121''
FIG 12D

SYSTEM AND METHOD FOR MONITORING HANDWASHING COMPLIANCE INCLUDING SOAP DISPENSER WITH INTEGRAL HAND-WASHING MONITOR AND SMART BUTTON SYSTEM

CROSS-REFERENCE TO RELATED APPLICATION

This application claims priority of U.S. Provisional Patent Application No. 62/406,492, filed on Oct. 11, 2016, entitled "SOAP DISPENSER WITH INTEGRAL HAND-WASHING MONITOR," and claims priority to and is a continuation-in-part of U.S. Non-Provisional patent application Ser. No. 15/443,081, filed on Feb. 27, 2017, and entitled "SYSTEM AND METHOD FOR MONITORING HANDWASHING COMPLIANCE," which claims priority of U.S. Provisional Patent Application No. 62/320,056, filed on Apr. 8, 2016, entitled "SYSTEM AND METHOD FOR MONITORING HANDWASHING COMPLIANCE," the entire contents of each of which are incorporated herein by reference.

BACKGROUND

Hospitals, restaurants and food manufacturing facilities all rely on the cleanliness of their employees. Many states have regulations concerning proper hand-washing procedures to minimize the danger infection and the transmission of pathogens. Despite these regulations, however, there continue to be numerous instances of infection and illness caused by poor and insufficient hand washing.

SUMMARY

A hand-washing monitoring system includes a motion detector mounted proximate the top of a sink and configured to detect a scrubbing motion at a location near an outlet of a faucet of the sink. The system further includes a processor coupled to the motion detector, and a memory coupled to the processor. The processor is configured to monitor the motion detector for signals indicative of scrubbing motion throughout a predetermined period or specified scrubbing interval, and to provide a signal indicating a satisfactory or successful scrubbing operation when a scrubbing motion is detected throughout the period or interval.

Another example of a hand-washing monitoring system includes a motion detector mounted proximate the top of a sink and configured to detect the presence of hands at a location below and/or in front of a faucet outlet of the sink, and, optionally, a scrubbing motion by the hands. The system includes a processor coupled to the motion detector and a memory coupled to the processor. The processor is configured to monitor the motion detector for signals indicative of the presence of the hands and/or the scrubbing motion that is persistent and/or continuous during a specified period or predetermined washing interval and to provide a signal indicating a successful washing operation when the presence of the hands and/or the scrubbing motion is detected throughout the entire period or interval.

In one embodiment, a control unit and display are integrated with a soap dispenser. The motion detector that monitors the location and/or scrubbing motion may also be integrated with the soap dispenser to provide a single unit that implements the hand washing protocol. The integrated soap dispenser may operate on battery power or may be powered by a power supply configured to receive operational power from the electrical wiring in the venue.

An example of a hand-washing monitoring system for use with a sink having a faucet and a soap dispenser is also provided. The hand-washing monitoring system including a motion detector, a proximity detector, one or more display devices, a processor and a memory storing program instructions. The motion detector may be mounted to the sink. The motion detector is configured to detect a scrubbing motion in or above the sink and beneath an outlet of the faucet. The proximity detector is mounted proximate the soap dispenser, and is configured to detect the application of soap to an object. The processor is coupled to the motion detector, the proximity detector and the one or more display devices, and the memory. The memory includes program instructions that, when executed by the processor, cause the processor to display, using one of the one or more of the display devices, a first prompt to place hands under the faucet. The processor monitors the motion detector for signals indicative of the presence of the hands beneath the faucet. Using one of the one or more display devices, the processor causes the display of a second prompt to apply soap to the hands. The processor monitors the proximity detector for signals indicative of the application of soap to the hands. The processor, using one of the one or more display devices, causes display of a third prompt to scrub hands. The processor monitors the motion detector for signals indicative of the scrubbing motion for a predetermined interval. The processor, using one of the one or more display devices, causes display of a fourth prompt to rinse the hands after the predetermined interval. The processor monitors the motion detector for the signals indicative of the presence of the hands beneath the faucet; and causes a fifth prompt to be displayed, using one of the one or more display devices, indicating completion of the hand washing.

In another embodiment, a hand-washing monitoring system for use with a sink may include a motion detector mounted proximate to a top surface of the sink and configured to detect a scrubbing motion at a location near an outlet of a faucet of the sink, a smart button device configured to be worn by a user and interact with the motion detector, the smart button device including a light indicator configured to at least one of change color and light status, a processor coupled to the motion detector and the smart button device, and a memory coupled to the processor. The memory may include program instructions that when executed by the processor cause the processor to: monitor the motion detector for signals indicative of the scrubbing motion throughout a predetermined scrubbing interval, provide a first output signal when the scrubbing motion is detected during the entire interval such that the first output signal is associated with a positive detection determination, transmit the first output signal to the smart button device, and set the light indicator of the smart button device to a positive indication color to indicate the positive detection determination.

In another embodiment, hand-washing monitoring system for use with a sink having a faucet and a soap dispenser may include a motion detector mounted to the sink and configured to detect a scrubbing motion near an outlet of the faucet, a proximity detector mounted proximate to the soap dispenser and configured to detect application of soap to an object, a smart button device configured to be worn by a user and interact with the motion detector and the proximity detector, the smart button device including a light indicator configured to at least one of change color and light status, one or more display devices, a processor coupled to the motion detector, the proximity detector, the smart button device, and the one or more display devices, and a memory coupled to the processor. The memory may include program instructions that cause the processor to: display, using one of the one or more display devices, a first prompt to place hands under the faucet, monitor the motion detector for signals indicative of the presence of the hands beneath the faucet, display, using one of the one or more display devices, a second prompt to apply soap to the hands, monitor the proximity detector for signals indicative of the application of soap to the hands, display, using one of the one or more display devices, a third prompt to scrub hands, monitor the motion detector for signals indicative of the scrubbing motion for a predetermined interval, display, using one of the one or more display devices, a fourth prompt to rinse the hands after the predetermined interval, monitor the motion detector for the signals indicative of the presence of the hands beneath the faucet, display a fifth prompt, using one of the one or more display devices, indicating completion of the hand washing, transmit a first output signal to the smart button device associated with the display of the fifth prompt indicating completion of the hand washing, and set the light indicator of the smart button device to a positive indication color and light status to indicate completion of the hand washing for the user.

In yet another embodiment, a smart button device for use with a hand-washing monitoring system including a monitor installed on a sink having a faucet is configured to be worn by a user and may include a housing, a light indicator disposed on the housing and configured to at least one of change color and light status, a processor coupled to the smart button device, and a memory coupled to the processor. The memory may include program instructions that when executed by the processor cause the processor to: adjust the light indicator from a positive indication color and a positive solid light status to an intermediate mode comprising at least one of a negative blinking light status and an alert indication color after a predetermined periodic cycle based on not receiving a prompt signal from the monitor indicative of completion of a hand washing for the user, adjust the light indicator from the intermediate mode to a negative solid light status and a negative indication color after a predetermined action period based on the absence of, or the failure to receive, a prompt signal from the monitor indicative of completion of a hand washing for the user during the predetermined action period, and adjust the light indicator from the intermediate mode to the positive indication color and the positive solid light status after the predetermined action period based on receiving a prompt signal from the monitor indicative of completion of a hand washing for the user during the predetermined action period.

BRIEF DESCRIPTION OF THE DRAWINGS

FIGS. 12A, 12B, 12C and 12D are plan views showing details of the example hand-washing monitoring system shown in FIG. 11.

DETAILED DESCRIPTION

Most soaps do not kill bacteria, viruses or other potentially contaminating pathogens that food service and hospital workers may carry on their hands. Some soaps include antiseptic or anti-bacterial agents that are meant to kill these pathogens. These agents, however, may not kill all of the contaminants if a particular pathogen has developed a resistance to the agent or if the agent is not applied properly. In addition, the antiseptic and antibacterial agents rinsed from the worker's hands may affect the water supply of downstream users of the water as the antiseptic or antibacterial agents may not be completely removed by water treatment facilities.

Hand washing can be more effective at removing these pathogens and may also be more environmentally friendly. To effectively remove pathogens, it is desirable for workers to scrub their hands for an extended period in order to loosen the pathogens so that they may be removed by the rinse water. Vigorous scrubbing between 15 and 30 seconds is usually sufficient to loosen most or all contaminants. Anything less, many contaminants could still be present on hands. In the materials that follow, the terms "worker" and "user" are used interchangeably to indicate a person washing her hands at a wash station according to a protocol described herein.

An example system that ensures compliance with an effective hand-washing protocol may monitor the presence of a worker's hands at a hand-washing station and, optionally, may monitor hand motion to ensure that the worker's hands are sufficiently scrubbed. The example systems described below employ a motion detector mounted on, or proximate to, a hand-washing station, such as a sink, to reliably detect vigorous hand-washing motion for a specific amount of time.

To ensure effective hand-washing, however, it may not be sufficient to monitor only the presence of the hands in the sink and a scrubbing motion over a desired washing interval. It is also desirable to ensure that soap or other cleaning agent was applied to wet hands prior to a scrubbing operation and that the workers rinse and dry their hands before returning to work. In addition, a single hand washing operation may not be sufficient to ensure cleanliness throughout an entire shift. To ensure cleanliness, it may be desirable for workers to periodically wash or to wash after certain activities, such as using the toilet.

The example systems may identify the workers as they begin to wash their hands and then monitor the hand-washing operation to ensure that it is effective. Both complete and incomplete hand-washing operations are recorded by the system and may be reported to a remote location to ensure compliance with any mandated procedures.

Figure 1:
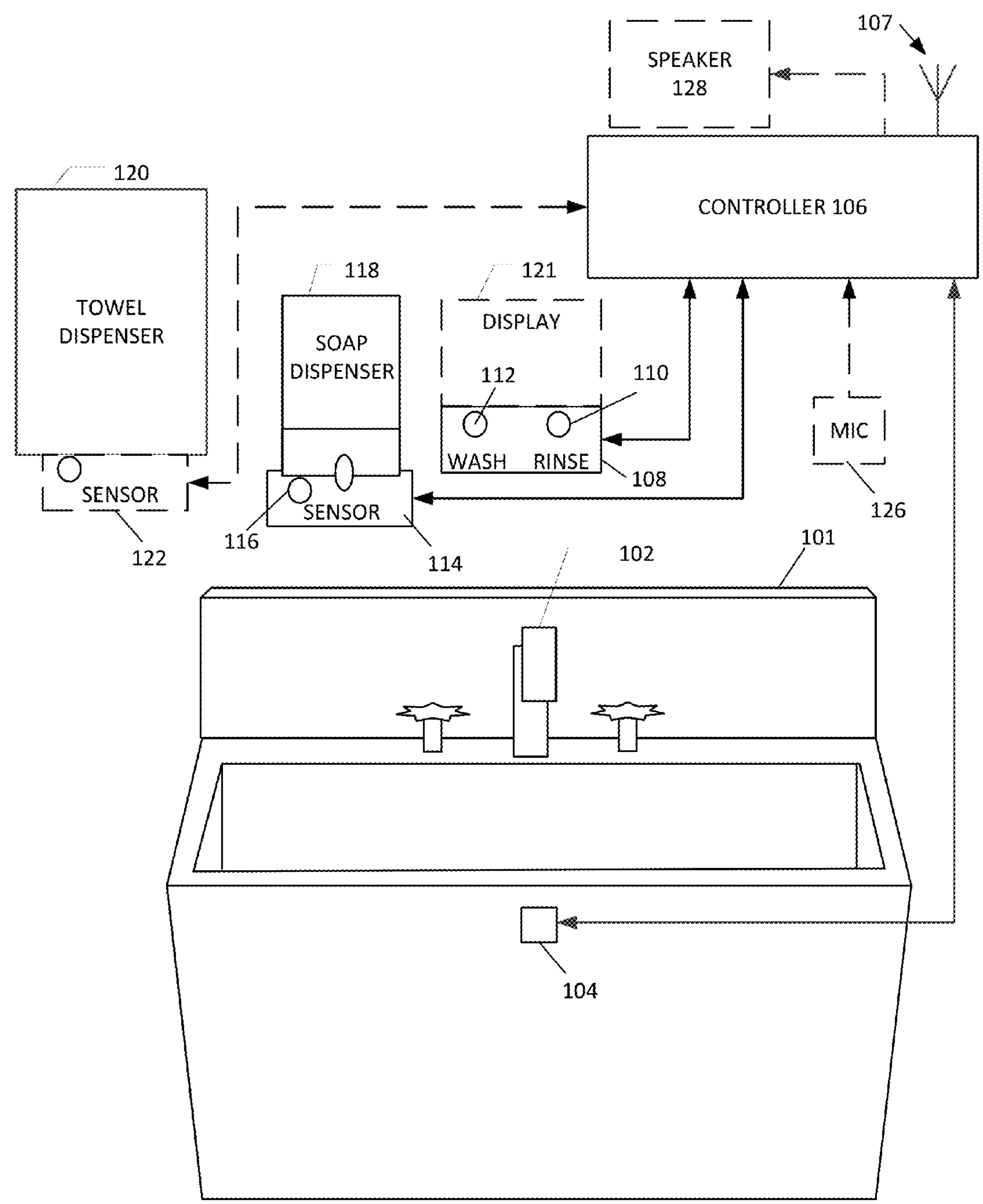
FIG. 1 is a block diagram, partly in perspective, of a sink in a food preparation establishment that includes a first example of a hand-washing monitoring system.

FIG. 1 is a block diagram, partly in perspective, of an example hand-washing station including an example monitoring system. The station includes a sink 100 having a backsplash 101 and a faucet 102. The sink also includes an example motion sensor 104, mounted through the front wall of the sink within a quarter of the front wall area extending down from the center of the top of the sink. Alternatively, the sensor 104 may be mounted on the top of the sink. The example sensor has a field of view into the sink, to detect a worker's hands located in the sink at positions both below the faucet 102 to detect wetting of hands and rinsing—and in front of the faucet 102 to detect washing. The motion sensor may be, for example, a pyroelectric infra-red (PIR) sensor. It is contemplated, however, that other types of sensors that can detect both heat and motion, such as an infra-red (IR) sensor may be used.

Although the sensor is shown as being mounted through the front of the sink, it is contemplated that it may be mounted in other locations, such as on top of the front of the sink, at the base of the faucet in back of the sink, or on or above the backsplash or on the wall behind the sink, as described below with reference to FIGS. 4C and 4D.

The sensor 104 provides signals indicating the presence or absence of hands in its field of view and, optionally, the presence or absence of scrubbing motion to a controller 106. The controller is also configured to provide signals to a display 108, to transmit data to a remote location using an antenna 107, and to both provide signals to and receive signals from a soap dispenser sensor 114 located near a soap dispenser 118. As shown in FIG. 1, the controller may also be coupled to a towel dispenser sensor 122, located near a towel dispenser 120, a microphone 126, a speaker 128 and an optional screen-type display 121. These devices are shown in phantom as they are optional.

The controller may be a stand-alone device or, as described below with reference to FIGS. 11 and 12A-12D, may be integrated with one of the devices at the hand washing station, for example, the soap dispenser.

As described above, the example motion sensor 104 is mounted through a hole in the front of the sink 100 and is configured to sense motion in the sink and above the top of the sink but below the faucet. Although the example in FIG. 1 shows the sensor mounted in the sink, it is contemplated that, alternatively, the sensor 104 may be mounted on the top of the front edge of the sink, facing the faucet, or on the top of the back edge of the sink, facing the front of the sink, as shown in phantom in FIG. 1. Example sensors 104 are described below with reference to FIGS. 4C and 4D.

PIR motion sensors are typically used to detect bodies moving through an area. Such uses include automatic on-off light switches and security system motion sensors. PIR sensors may also be used in automatic faucets, soap dispensers and towel dispensers to dispense water, soap and towels after detecting the presence of a user's hands. These sensors, however, merely detect the presence of the hands by their IR heat signature and/or just detect motion. They do not detect a scrubbing motion.

Although the embodiments described below concern the detection of both the presence of the hands in the sink below and in front of the faucet outlet and the detection of a scrubbing motion, it is contemplated that the system may be implemented using a PIR motion sensor that detects the presence of the hands in the sink without detecting the scrubbing motion. The duration of this detection, however, is the same as the duration of the scrubbing motion. This embodiment assumes that if the worker has her hands in the sink she is performing a scrubbing operation.

The motion sensor 104, shown in FIG. 1 detects both the presence of the hands and the presence of the scrubbing motion. The sensor 104 has a greater range (e.g. up to 40 cm or up to 25 cm) than motion sensors commonly used with automatic faucets and soap dispensers and a smaller range than security system sensors, as it detects heat and motion in an area below and/or in front of the faucet 102 and extending into the sink 100. Sensors having this intermediate range may also detect extraneous motion, such as a person walking past the front of the sink. This motion may be detected because the sink 100 and back splash 101 are made from stainless steel, which reflects IR radiation. The sensor 104 is adapted to reliably sense scrubbing motion while ignoring extraneous motion.

Each item of the example system is described below with reference to FIGS. 2-6, and the operation of the example system is described below with reference to FIGS. 8A and 8B, and are shown in FIGS. 9A through 9E.

Figure 2:
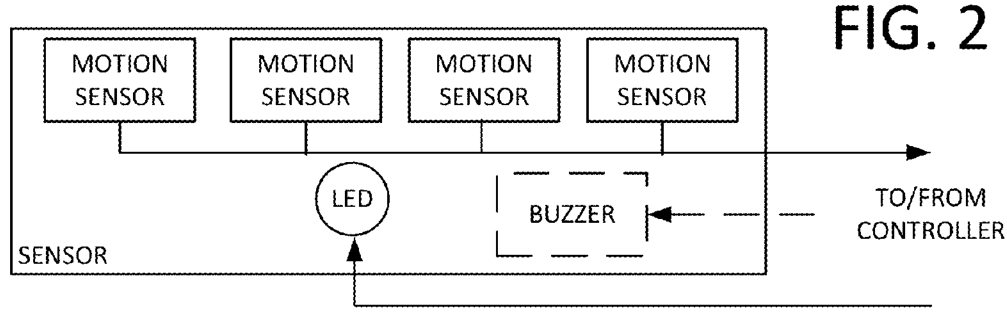
FIG. 2 is a block diagram of a sensor module suitable for use with the system shown in FIG. 1.

FIG. 2 is a block diagram of an example sensor suitable for use as the soap dispenser sensor 114 or towel dispenser sensor 122, shown in FIG. 1. The example sensor includes multiple motion sensors 202, a light-emitting diode (LED) 116 and an optional buzzer 204. The LED 116 may be a single color LED or a multi-color LED (e.g. red, green and yellow). When the controller 106 determines that it is time for the worker to use the soap dispenser or towel dispenser, it sends a signal to illuminate the LED 116 (e.g. yellow). When the signal provided by the motion sensor 202 to the controller 106 indicates motion proximate to the soap dispenser 114 or towel dispenser 120, the controller 106 records the dispensing of soap or a towel and turns off the LED 116 or changes the color of the LED, for example, to green. If no motion is detected during a preset interval after the LED is illuminated, the controller may sound the buzzer 204 and may cause the LED to flash and/or change the color of the LED, for example, to red.

The motion sensors 202 may be short-range include short-range motion and/or IR sensors such as the TMD2772 or TMD2772WA Ambient Light Sensor available from AMS AG, Tobelbaderstrasse 30, 8141 Premstaetten. Austria, These sensors include a range finder and may be configured to detect the presence of a hand within zero to five cm of the soap sensor 114 or within zero to 15 cm of the towel dispenser sensor 122. In one implementation, the soap dispenser sensor 114 may include one or two sensor elements while the towel dispenser sensor 122 may include between one and four sensor elements 202. The different numbers of sensor elements ensure coverage over the entire area beneath the respective sensors.

Figure 3:
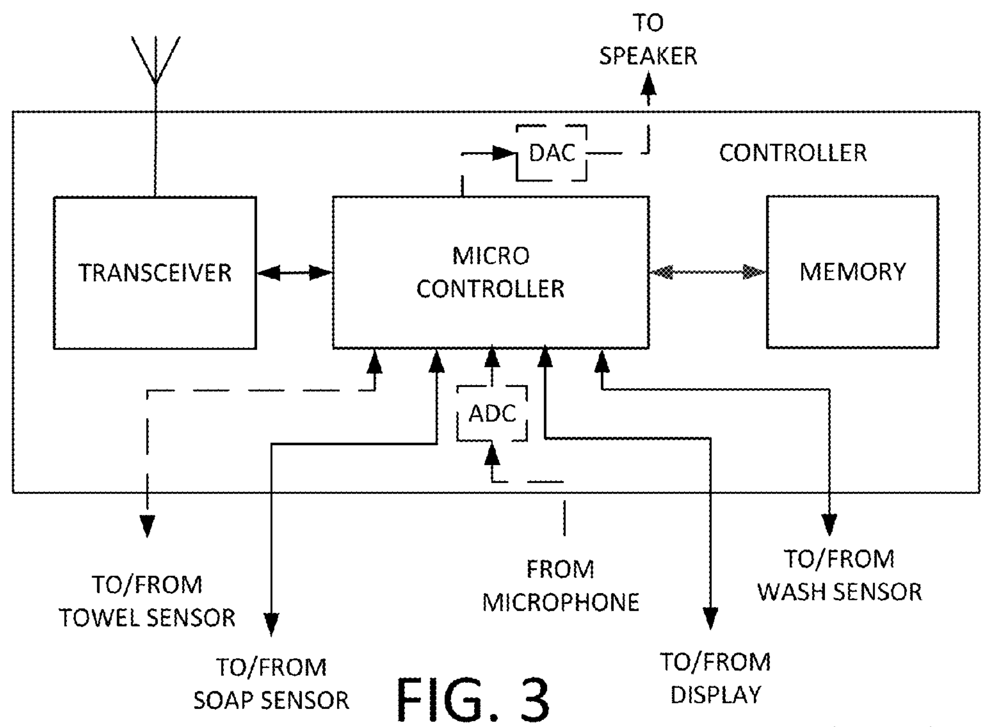
FIG. 3 is a block diagram of a controller module suitable for use with the system shown in FIG. 1.

FIG. 3 is a block diagram of a controller suitable for use as the controller 106, shown in FIG. 1. The example controller includes a microcontroller 302, memory 304 and short-range transceiver 306. The microcontroller 302 may include one or more of a microcontroller, a microprocessor and/or a digital signal processor (DSP). Alternatively or in addition, the controller 106 may include an application specific integrated circuit (ASIC), a complex programmable logic device (CPLD), or a field programmable gate array (FPGA) programmed to perform the functions shown in FIGS. 8A and 8B.

The short-range transceiver 306 may be, for example, a Wi-Fi IEEE 802.11 transceiver, a Bluetooth® transceiver, a Zigbee IEEE 802.15 transceiver or a cellular transceiver. The transceiver 306 may establish a wireless connection to a remote computer that receives hand-washing reports from the controller 106. The remote computer may also perform some of the functions described as being performed by the controller, such as, for example, voice recognition, facial recognition or palm recognition to identify the worker and the generation of reminders for each worker for multiple hand-washing procedures during the shift. Although the short-range transceiver 306 is shown as being wireless, it is contemplated that it may be implemented as a wired connection. In this instance the transceiver 306 may be an Ethernet network adapter coupled to the a wired network connection. In this embodiment, the remote computer may also be connected to the network via a wired connection.

The controller 106 may also include an analog-to-digital converter 308 that digitizes signals provided by the optional microphone 126. The controller 106 may use these signals to perform a voice-recognition operation in order to identify the worker currently engaged in the hand-washing operation. Alternatively, the controller may digitize the signals provided by the microphone and send them to the remote computer to perform the voice-recognition operation.

Although the embodiments described below employ a display device such as one of the devices 108 and 121 to prompt the worker to perform the sequence of steps, it is contemplated that the system may be implemented with audio prompts provided by the optional speaker 128. The display devices such as 108 and 121 may be indicator lights, such as light emitting diodes or the like. When the speaker is used, the controller may generate digital audio signals, convert these signals to analog signals, using a digital to analog converter (DAC) 310, and send the analog signal to the speaker 128.

Figure 4A:
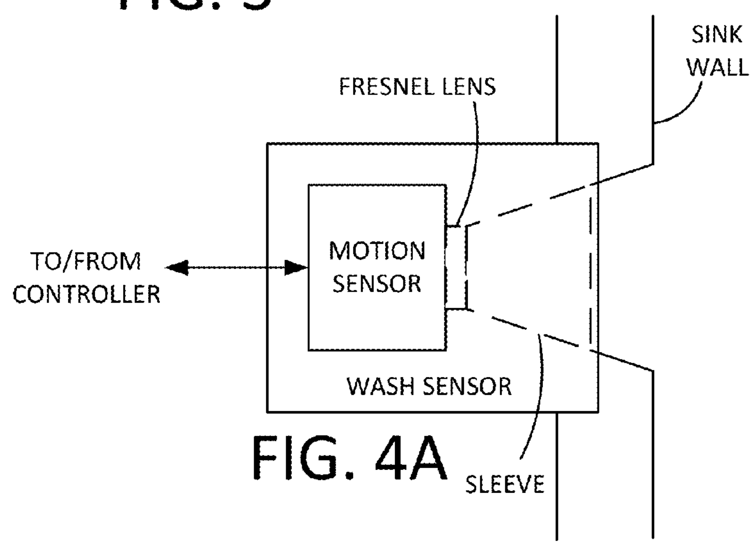
FIGS. 4A, 4B, 4C and 4D are block diagrams of sink sensors suitable for use with the system shown in FIG. 1.

FIGS. 4A-4D show example wash sensors that may be used to detect the presence of a worker's hands near, or, more specifically, in or above, the sink and to detect scrubbing motion when the hands are present. The wash sensor 104 includes a motion sensor 402, optional Fresnel lens 404 and optional sleeve 406. As shown in FIG. 4A, the wash sensor 104 is configured to be mounted in the front wall of the sink, pointing at an area near, such as in or above, the sink and below the faucet 102. Although the embodiment describes using a diffractive Fresnel lens, it is contemplated that a refractive lens may be used in place of the Fresnel lens. The lens 404 focuses the IR radiation emitted by the worker's hands onto the pyroelectric sensor elements of the example motion sensor 402. The example motion sensor includes two pyroelectric elements horizontally spaced apart from each other. The motion of the scrubbing hands causes different levels of IR radiation to be focused on the different elements at different times. The wash sensor is configured to provide the amplified difference between the signals produced by the two sensors as the output signal. Thus, the detected scrubbing motion produces a time-varying output signal from the wash sensor 104.

The motion sensor 402 may be, for example, the DP-003B, digital pyroelectric motion detector, described above, and the Fresnel lens 404 may be, for example, a FL35 Fresnel dome lens, which is available from Glolab Corp. Wappingers Falls N.Y. Alternatively, the sensor 404 may be the TMD2772 or TMD2772WA Ambient Light Sensor described above and/or the lens 404 may be a refractive lens having properties similar to the Fresnel lens. The optional sleeve 406 reduces the field of view of the sensor 402 to remove extraneous IR signals, such as a person walking past the sink. When the TMD2772 or TMD2772WA sensors are used, the Fresnel lens and sleeve may not be needed. As an alternative to using the sleeve, it is contemplated that a portion of the front of the Fresnel lens 404 may be covered, for example, with a painted ring so that only the center of the lens is exposed to light. This ring, may, for example, cover up to 40% of the lens surface.

The TMD2772 and TMD2772WA sensors each includes both an IR LED and two photodiodes, one sensitive to IR and the other sensitive to both IR and visible light. The IR LED and the IR photodiode are configured to limit the range in which the other photodiode detects IR or visible light. This range may be preset or may be automatically set, using software running on the controller 106, to the distance between sensor and the front or back of the wash station sink when the sensor is mounted on the back or front of the sink, respectively. Example ranges are less than 40 cm and less than 25 cm depending on the positioning of the sensor and the size of the wash sink. In this configuration, the sensor will not detect spurious IR radiation from outside the sink. The proximity detection includes a proximity offset register to compensate the optical system for crosstalk between the IR LED and the photosensors. Furthermore, to reduce false proximity measurement readings, the sensor includes a proximity saturation bit signal that may be used to indicate that the internal analog circuitry has reached saturation.

Each of the sensors may include filters that detect only a range of IR wavelengths emitted by human skin. These wavelengths may be, for example, between 8 μm and 11 μm.

Figure 4B:
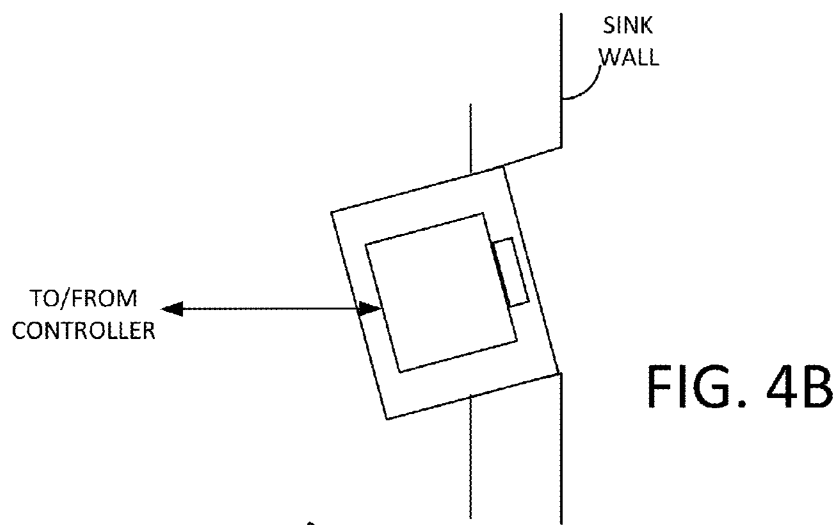

FIG. 4B is a block diagram of a different wash sensor 104'. Although the sensor 104' is shown without the sleeve 406, it may be structurally the same as the sensor 104 shown in FIG. 4A. Sensor 104' differs from sensor 104 in that it is mounted at an upward angle in the front wall of the sink. This upward angle may cause the center of the field of view of the motion sensor 402 to be located above the sink but below the faucet, where workers are most likely to position their hands during a washing operation.

Figure 4C:
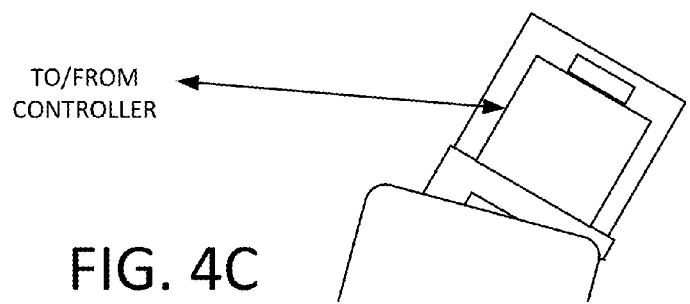
Figure 4D:
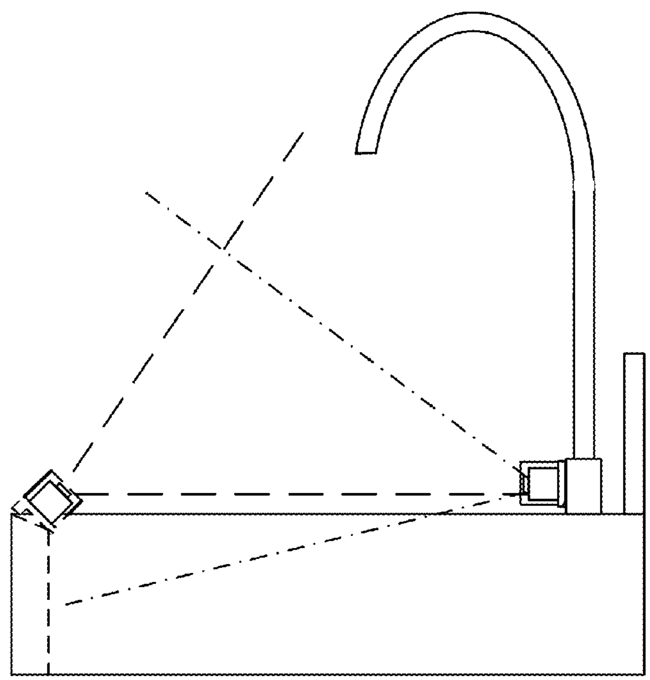

FIGS. 4C and 4D illustrate other possible wash sensors 104". These sensors may be identical to the sensors 104 and 104' shown in FIGS. 4A and 4B except that they are mounted on top of the sink at an angle such that the center of the field of view of the sensor 104" is below the outlet of the faucet 102' but above the top of the sink 100, as shown in FIG. 4D. This sensor may detect scrubbing motion in an angular range indicated by the dashed lines 406. FIGS. 4C and 4D illustrate placement of the sensor on the top of the front rim of the sink, it does not show a housing for the sensor. It is contemplated that the sensor, mounted in this location may benefit from having a more robust housing that protects the sensor against inadvertent jolts.

As shown in FIG. 4D, it is contemplated that the sensor 104" may be mounted on top of the back of the sink, for example, where the faucet meets the sink. This sensor may be mounted to sense motion in an angular range indicated by the lines 408 having alternating dashes and dots.

Although the described embodiments show the sensor as being mounted to the sink, it is contemplated that it may be mounted on the backsplash 101 either under the faucet or on a corner of the sink. Alternatively, the sensor 104 may be mounted on the wall behind the backsplash. The field of view of the sensor is near the sink, desirably below and/or in front of the faucet outlet and in or above the sink.

Figure 5A:
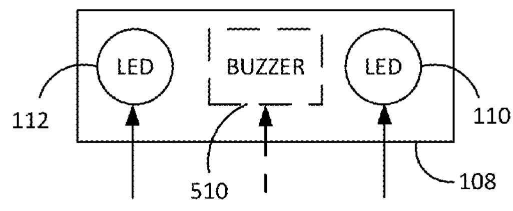
FIGS. 5A and 5B are block diagrams of display modules suitable for use with the system shown in FIG. 1.
Figure 5B:
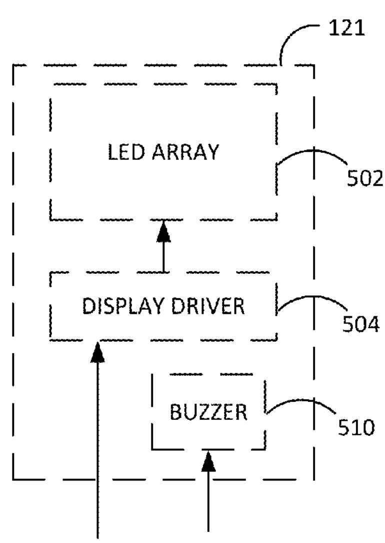

FIGS. 5A, 5B and 6 illustrate two example displays that may be used with the system shown in FIG. 1. FIG. 5A shows a simple two-LED display 108 that is shown in the system of FIG. 1. This display includes a wash LED 112 and a rinse LED 110 and an optional buzzer 510. As described above, the LEDs 110 and 112 may be single-color or multi-color LEDs. Each of these LEDs and the optional buzzer 510 is controlled by the controller 106. The controller 106 lights the wash LED to prompt the workers to scrub their hands vigorously. This LED remains lighted for an appropriate amount of time, 10 to 30 seconds, 15 to 25 seconds or 20 seconds for example, to ensure a proper hand-washing operation. The controller 106 may include an internal timer (not shown) to count-down this interval. If a scrubbing motion is not detected at any point during this interval, the controller 106 stops the timer and causes the wash LED 112 to blink and/or change color (e.g. from yellow to red) and sound the buzzer 510 until scrubbing is again detected. If scrubbing does not resume within a suitable pause period, for example 1 to 10 seconds, the controller 106 records the hand-washing operation as a failure and reports the failure to the remote computer. The controller may turn off the wash LED 112 or change its color (e.g. from yellow to green) after a satisfactory hand-washing operation. The controller may then turn on the rinse LED 110. The controller turns off rinse LED 110 (or changes its color from yellow to green) a few seconds after the worker's hands are again detected by the wash sensor 104 as being under the faucet. If no motion is detected during the rinse interval, the controller may cause the rinse LED 110 to blink and/or change its color (e.g. from yellow to red) and may sound the buzzer 510.

Figure 6B:
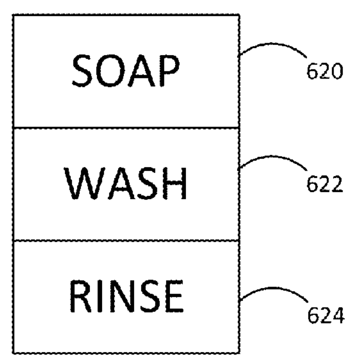
FIGS. 6A and 6B are display diagrams showing an example display sequence that may be displayed using the display module shown in FIG. 5B.
Figure 6A:
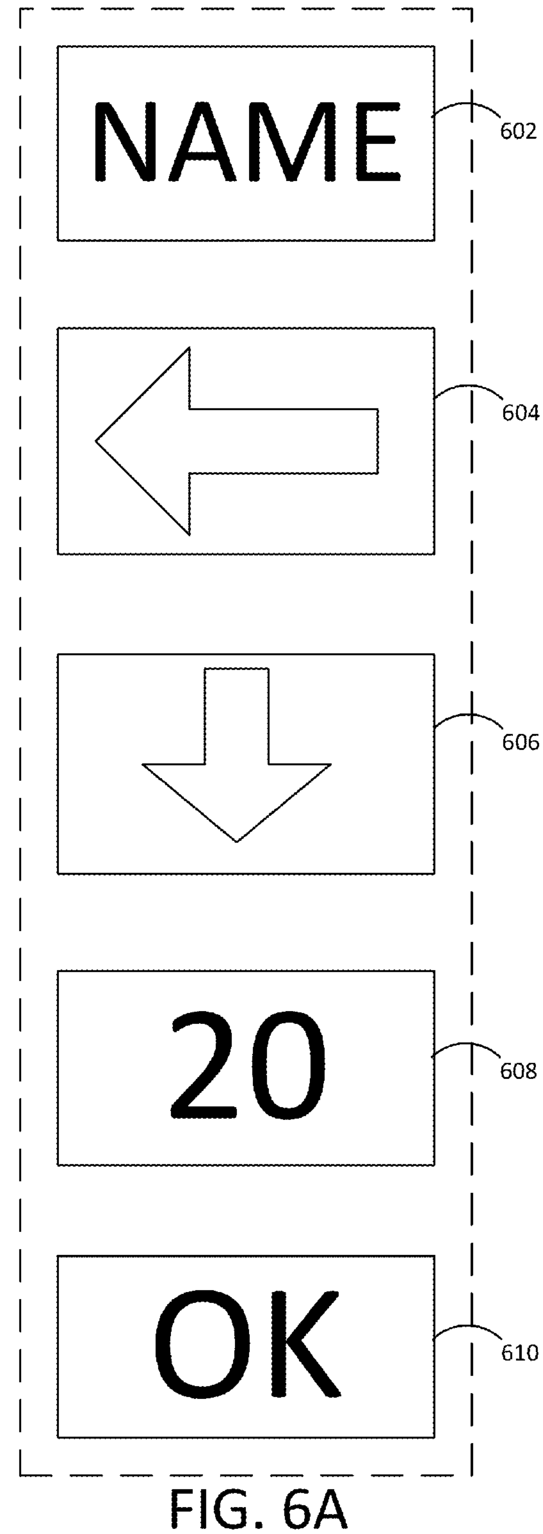

FIGS. 5B, 6A and 6B show a different type of display 121 that includes a multi-pixel display element 502 driven by a display driver 504 and the optional buzzer 502. In the example of FIG. 5B, the display element 502 may be an LED array that includes multiple rows of LEDs that may be either single-color or multi-color. It is contemplated, however, that this display may use other display techniques such as liquid crystal elements, electroluminescent elements or electronic paper display elements.

As shown at 602 of FIG. 6A, the controller 106 controls the display 121 to prompt the worker to state her name. The controller then receives signals from the microphone 126 to detect the name of the worker. Audio signals detected by the microphone 126 are processed either by the controller 106 or by the remote computer (not shown) through a voice recognition algorithm to determine the speech content of the audio signals. In one embodiment, the microphone 126 may be replaced by a modular voice-recognition system, such as the SpeakUp speech recognition Click™ board available from MikroElectronica D.O.O. Batajnički drum 23 11186 Zemun, Belgrade, Serbia. This system, which includes a microphone, a microcontroller and a memory, is designed to recognize worker names that have been previously input to the system by each worker stating his or her name.

Alternatively, as described below with reference to FIGS. 11 and 12A-12D, the system may identify the worker by recognizing her face as she stands at the wash station or by recognizing her palm as she reaches for soap from the soap dispenser 118. The system may, for example, use facial recognition software such as the Verilook Mega Matcher system available from Neurotechnology, Vilnius, Lithuania. The palm recognition system may use a version of the Verilook system modified to recognize images of hands. Multiple recognition systems may be combined to ensure proper identification. Any or all of the systems may be implemented in the controller 106 or in the remote computer (not shown).

After the worker has been identified, the pixel array 502 displays a left arrow 604 to prompt the worker to take soap from the soap dispenser 118. The soap dispenser sensor 114 may or may not include the LED 116. If the sensor 114 includes the LED 116, the controller may light the LED at the same time that the left arrow 604 is displayed. When the worker's hand is detected near the soap dispenser by the sensor 114, the display provided by the pixel array may change to a down arrow 606 to prompt the worker to scrub her hands. Once scrubbing motion is detected, the controller 106 and display driver 504 cause the display to count down the scrubbing time.

As described above, the PIR sensor 402 provides a signal indicating changes in ambient IR signals detected by the sensor. This signal may be filtered by the controller 106, or the controller 106 may transmit the signals to the remote computer (not shown) and the signals may be filtered there, to detect changes in the signal that are consistent with a hand-washing operation. For example, the signal may be filtered to remove any frequencies less than 0.01 Hz and greater than 1 Hz. It is contemplated that smaller or larger ranges may be used.

In this example, the scrubbing time is set to 20 seconds as shown by element 608 of FIG. 6A. As described above, with reference to the display 108, if an interruption in the scrubbing motion is detected, the display blinks at its current setting and may change color (e.g. from yellow to red) and sound the buzzer 510 until the scrubbing motion is detected again. Also, if the interruption in the scrubbing motion is exceeds a specified range, an error indicator (not shown) may be displayed, and the failed hand-washing for the identified worker is reported to a remote computer. If the controller 106 detects the scrubbing motion throughout the prescribed scrubbing time (e.g., 20 seconds) in block 610, it causes the pixel array 502 to display "OK" or some such affirmative indication, optionally in green. After the scrubbing operation is complete, the controller 106 may cause the pixel array 502 to again display the down arrow, prompting the worker to rinse her hands. These same durations apply whether the sensor detects the presence of the hands in the sink and/or the scrubbing motion.

FIG. 6B shows an alternative multi-LED display. This display may include an array of LEDs or three LEDs. In this display, the top LED 620 is red and lights-up to prompt the worker to apply soap. It stays lighted for 10 seconds or until motion is detected at the soap dispenser. If no motion is detected within 10 seconds, the LED 620 flashes on and off and the buzzer 520 sounds. Once soap is applied, the yellow wash LED 622 lights-up. This LED stays lighted for 20 seconds as long as scrubbing motion is detected by the sensor 104, 104' or 104". If there is a break in the scrubbing motion for a prescribed period, LED 622 flashes on and off and the buzzer 520 sounds until the scrubbing motion is again detected. After a successful scrubbing operation, the LED 624 lights-up to prompt the user to rinse.

Figure 7A:
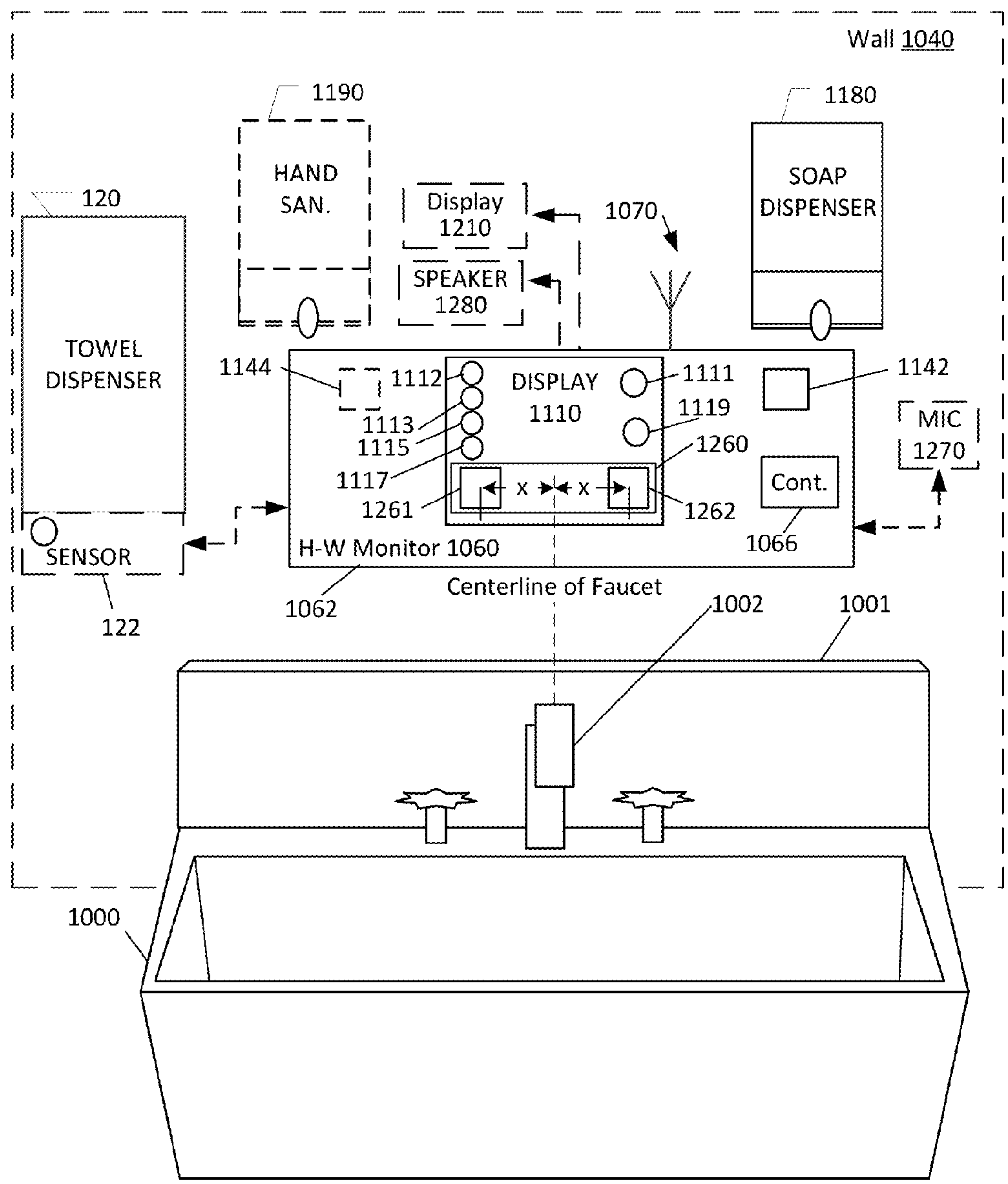
FIG. 7A is a block diagram, partly in perspective, of a sink in a food preparation establishment that includes a second example of a hand-washing monitoring system.

FIG. 7A is a block diagram, partly in perspective, of a sink in a food preparation establishment that includes a second example of a hand-washing monitoring system. The example of the hand-washing monitoring system is used in a similar food preparation environment as the station in FIG. 1. For example, the sink 1000, the backsplash 1001 and a faucet 1002 are similar to the sink 100 in FIG. 1, except that the sink 1000 of FIG. 7A does not include the motion sensor 104.

In contrast to the system of FIG. 1, the hand-washing monitor 1060 contains at least one proximity sensor 1142 and/or 1144, indicator lights 1111, 1112, 1113, 1115 and 1117 of the display 1110, controller 1066, and motion detector elements 1261 and 1262 within a housing 1062. For example, the hand-washing (H-W) monitor 1060 is mountable to a wall 1040 or other surface of a food preparation area using Velcro®, screws, nails, hooks, tape, adhesives or other mounting devices or methods.

The hand-washing monitor 1060 may include: a housing 1062; a motion detector 1260; at least one proximity sensor, such as 1142, 1144 or both; a display 1110; and a controller 1066. The housing 1062 may, for example, contain the controller 1066, the first and second proximity sensors 1142 and 1144, the motion detector 1260 and the display device 1110.

The display device 1110 includes the indicator lights 1111 (e.g., "Re-Wash"), 1112 (e.g., "wet hands first"), 1113 (e.g., "Apply Soap"), 1115 (e.g., "Wash Hands"), 1117 (e.g., "Rinse Hands") and 1119 (e.g., a positive message, such as "Great Job" or the like) that are controlled by controller 1066 to prompt a user in the performance of a proper hand-washing sequence and technique. The indicator lights 1112, 1113, 1115 and 1117 may be used to prompt a user in the hand-washing sequence and technique. For example, the "wet hands first" indicator 1112 may light and remain lit until hands are detected in a detection area. When the proper hand washing sequence ends, the indicator light 1112 may light again and remain lit until another hand washing sequence begins. While indicator light 1111 may indicate to the user that the hand-washing sequence and/or technique was unsuccessful, indicator light 1119 may provide positive reinforcement to the user by indicating to the user the hand-washing technique and followed the hand-washing sequence were successfully performed. The indicator lights 1111, 1112, 1113, 1115, 1117, and 1119 may be similar colors, different colors or multi-colored LEDs.

The motion detector 1260 may include an emitter such as 1261 and a receiver such as 1262. The emitter 1261 may be located on a first side of the faucet 1002, and the receiver 1262 may be located on a second side of the faucet 1002 (opposite the emitter 1261). The emitter 1261 is configured to emit infrared light toward an area, such as hand detection area 1220 of FIG. 7B in front of the faucet where the hand scrubbing motion is to take place. The emitter 1261 is configured to emit an infrared light beam toward the hand detection area 1220, which is in the field of view of the receiver 1262. For example, the motion detector 1260 is configured to detect, based on the reflections of the infrared light emitted by the emitter, from hands and/or a scrubbing motion in the detection area 1220 of FIG. 7B. For example, when the motion detector 1260 is centered over the centerline of the faucet 1002, the emitter 1261 is approximately a horizontal distance X from the centerline of the faucet 1002 and the receiver 1262 is also approximately a horizontal distance X from the centerline of the faucet 1002. With the emitter 1261 and the receiver 1262 aligned as described above, the infrared light emitted by the emitter 1261 is directed into the field of view of the receiver 1262 such that any reflections from an object, such as a hand, are detectable by the receiver 1262. The receiver 1262 is configured to detect infrared light reflections from the hand detection area, and generate signals indicative of a scrubbing motion in the hand detection area.

The receiver 1262 may be positioned to detect infrared signals indicative of persistent and/or continuous scrubbing motion that occurs in the area (e.g., 1220 of FIG. 7B) in front of the faucet 1002. In more detail, the receiver 1262 is configured to detect reflections of the infrared beam emitted by the emitter 1261 that are indicative of the heat and motion due to in the hand detection area, such as 1220. A scrubbing motion by a user may result in reflections of the infrared beam indicative of heat and motion. The relationship between the emitter 1261 and the receiver 1262 may be summarized such that the infrared beam output from the emitter 1261 intersects an area that is observed by the receiver 1261.

The motion detector 1260 generates signals indicating the presence or absence of a user's hands performing scrubbing motion that are provided to the controller 1066 of the hand-washing monitor 1060. The controller 1066 may be configured similar to the example of controller 106 as shown in FIG. 3. The controller 1066 also may perform functions similar to those performed by the controller 106. For example, the controller 1066 may include a processor that is coupled to a memory. The memory may store program instructions that when executed by the processor configure the controller 1066 to perform functions. In an example, the controller 1066 monitors the motion detector 1260 for signals indicative of the scrubbing motion during a predetermined scrubbing interval (as described with respect to other examples) in the hand detection area. The controller 1066 provides a first output signal when the scrubbing motion is detected during the entire predetermined scrubbing interval. The first output signal may be to one or more of the indicator lights 1111-1119 of the display device 1110.

The controller 1066 is also coupled to provide signals to a display 1110, to a transceiver that transmits data to a remote location using an antenna 1070, and to receive signals from the at least one proximity sensor 1142 located, for example, near a soap dispenser 1180. As shown in FIG. 7A, the hand-washing monitor 1060 may also be coupled to: a towel dispenser sensor 122 located near a towel dispenser 120, an optional microphone 126, an optional speaker 128, and an optional screen-type display 1210. The proximity sensor 1144 may be in proximity to an optional hand sanitizer dispenser 1190. These devices are shown in phantom as they are optional.

Figure 7B:
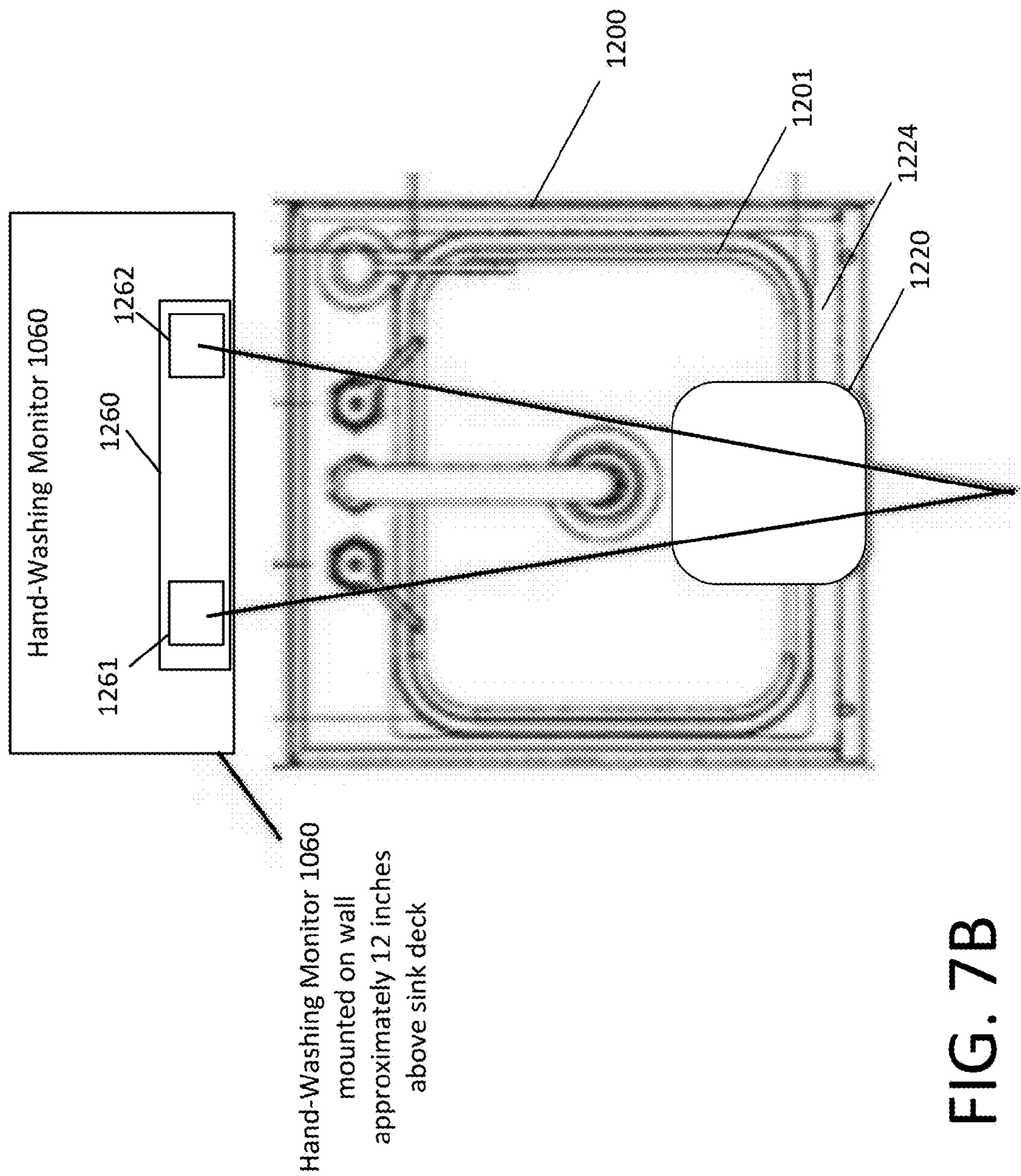
FIG. 7B is an overhead plan view of a sink in a food preparation establishment including the hand-washing monitoring system of FIG. 7A that illustrates the field of view of motion sensors of the hand-washing monitoring system of FIG. 7A.

The hand-washing monitor 1060 may be mounted to the wall 1040 approximately 12 inches above the sink deck 1224 of sink 100A as shown the example of FIG. 7B. FIG. 7B also shows examples of the arrangement of the hand-washing monitor with respect to a sink and faucet. For example, the minimum sink length from the wall to the front edge of the sink may be approximately 14 inches, the maximum sink length from the wall to the front edge of the sink may be approximately 14 inches, and a person may be detected outside the front edge of the sink up to approximately 8 inches. The hand detection area 1220 is approximately 12 inches in diameter and may centered on the faucet 1002 centerline, is a minimum of approximately 12 inches in the vertical direction from the sink deck 1224 (e.g., in the direction extending out of the page toward a viewer), and may be a minimum of 6 inches from the outside edge 1201 of the sink 1200 into the sink 1200.

As described below, the controller 106 of FIG. 1 controls the display 108, soap dispenser 118, and sensor 104 to implement a prompt to a worker to perform a sequence of steps and monitor the performance of those steps to implement a hand-washing operation. Examples of hand-washing operations are shown in FIGS. 8A, 8B, 9A, and 9B.

Figure 8A:
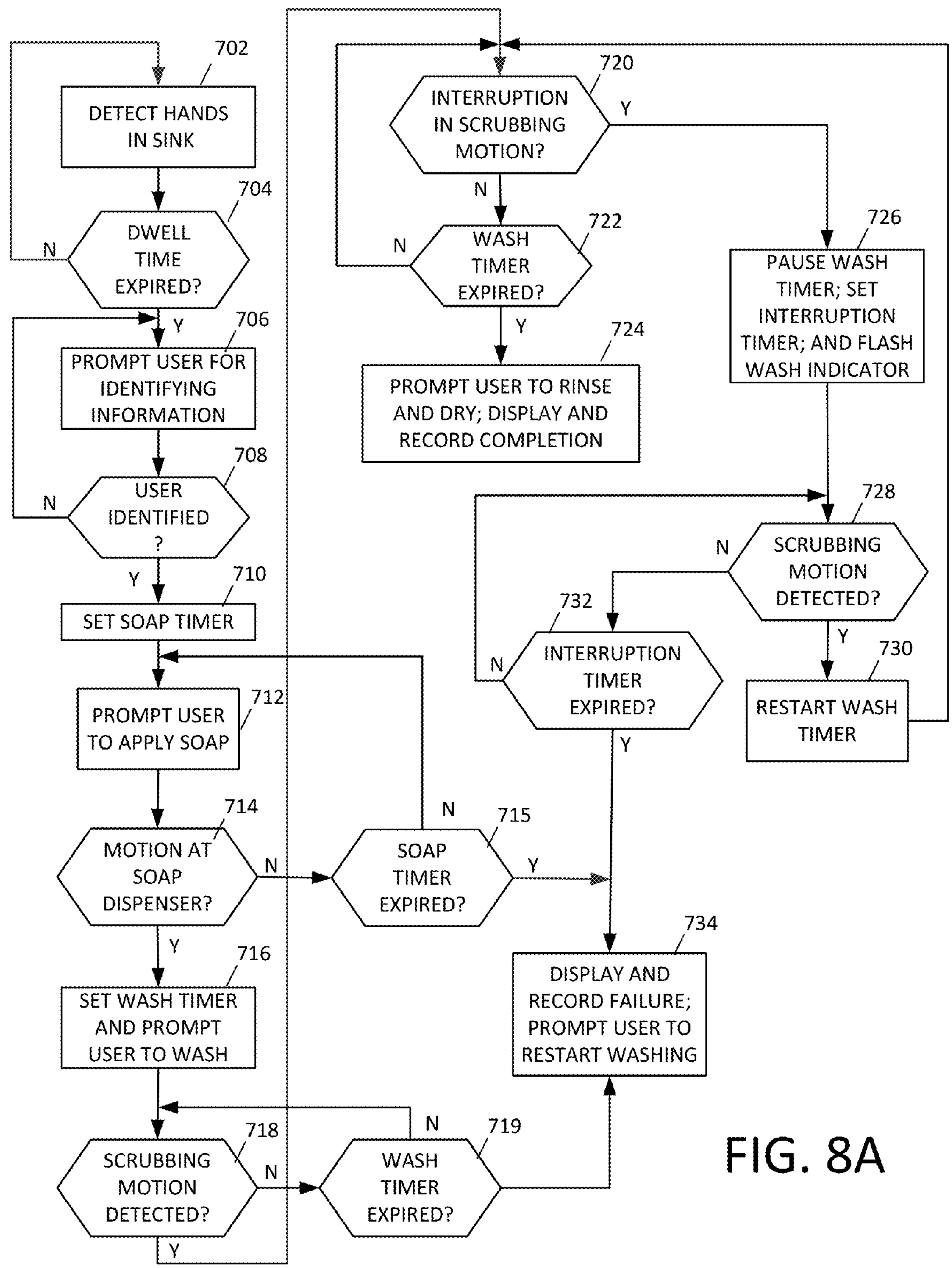
FIGS. 8A and 8B are flow-chart diagrams that are useful for describing the operation of the examples of the hand-washing monitoring systems such as those shown in FIGS. 1 and 7A.
Figure 8B:
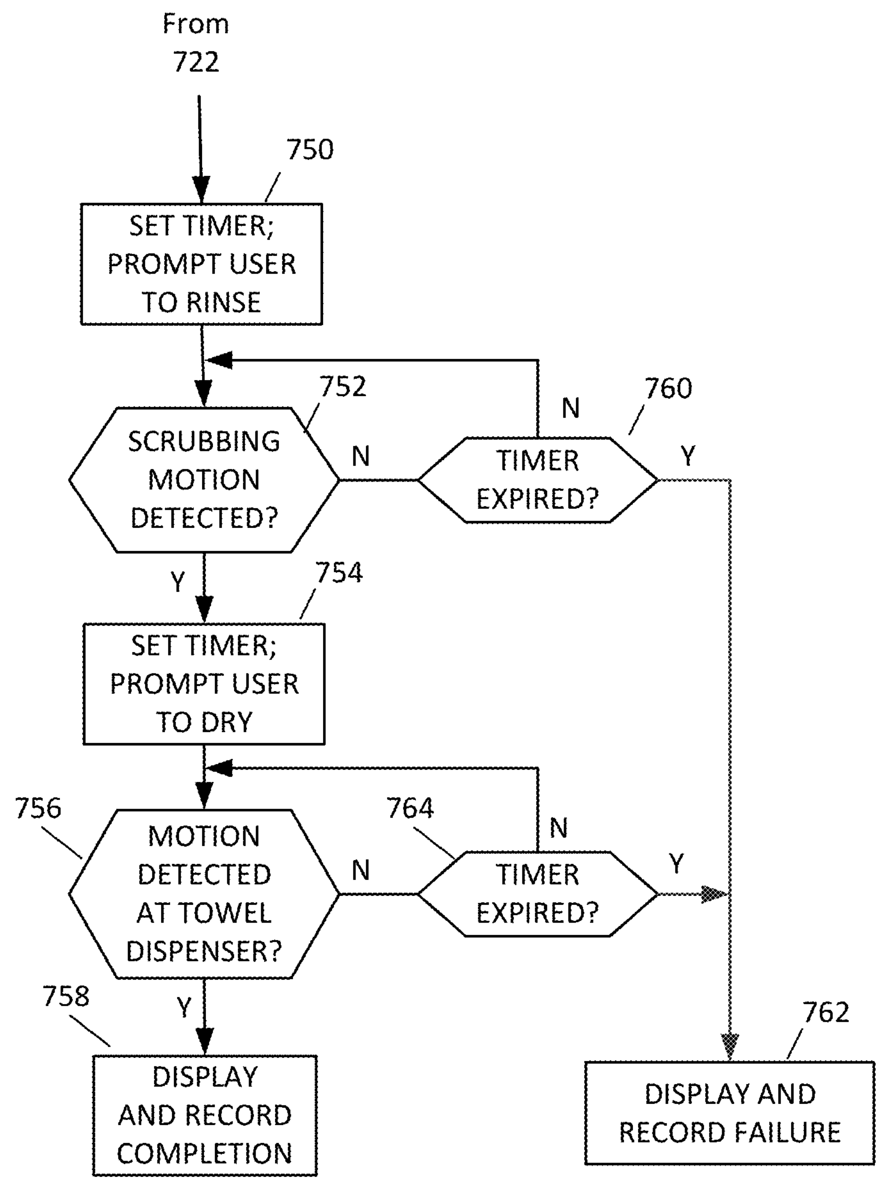

At block 702 of FIG. 8A, the process begins when the controller 106 detects hands in the sink 100 using one of the motion sensors 104, 104' or 104". To ensure that the detection is not a spurious event, the controller, at block 704, may monitor the motion sensor for presence of the hands for a dwell time, for example, of 1 to 3 seconds, 0.5 to 5 seconds, 0.5 to 2.5 seconds or the like. This block may not be needed if the motion sensor includes a range finder, as described above. Once the dwell timer has expired, control transfers to block 706 in which the controller, using the optional display 121 or the speaker 128 may prompt the worker to provide identifying information. In a more specific example, the worker may state her name, which is received, for example, via the microphone 126 of FIG. 1, and recognized by the controller 106 or by the remote computer, running a voice-recognition algorithm. It is contemplated, however, that other types of biometric identification may be used, such as fingerprint detection, facial detection, facial recognition, palm recognition, iris recognition or retina scan. Alternatively non-biometric methods may be used, such as having workers touch their names on an input device (not shown) to initiate the hand-washing operation.

When the worker is identified at block 708, the controller 106, at block 710, sets a timer that allows the worker an amount of time to wet her hands and apply soap. Next, at block 712, the controller lights the LED 116 or displays the left arrow on the display 121 to prompt the worker to apply soap. At block 714, the controller 106 determines whether the motion sensor 114 has detected the presence of a hand at the soap dispenser 118. If the hand is not detected, block 715 determines whether the soap timer has expired. If it has, control transfers to block 734 to record and report a failed hand-washing operation for the identified worker and to prompt the worker to repeat the procedure. If, at block 715, the soap timer has not expired, the controller repeats blocks 712 and 714 until the application of soap is detected.

To determine whether the worker has wet her hands before applying soap, the system may begin to monitor the scrubbing sensor as soon as the worker is detected at the wash station. Alternatively, if the faucet 102 is a touchless faucet, the system may interface with the detector in the faucet to determine if the faucet dispensed water immediately before the worker applied soap.

Next, at block 716, the controller 106 sets the wash timer and prompts the worker to scrub her hands. At block 718 the controller checks the signal from the motion sensor 104, 104' or 104" to determine whether the worker is scrubbing her hands. If no motion is detected, block 719 determines whether the wash timer has expired. If it has, the controller 106 records and reports a failed hand-washing operation for the worker at block 734. If the wash timer has not expired, the controller 106 repeats block 718 until motion is detected or the timer expires.

When motion is detected blocks 720 and 722 continually monitor the motion detector 104, 104' or 104" to detect intervals in which the scrubbing motion is interrupted. If the scrubbing motion is detected until the wash timer expires, the system, at block 724, prompts the worker to rinse and dry her hands, and reports a successful hand-washing operation for the identified worker.

If an interruption or gap is detected, block 726 pauses the wash timer, sets an interruption or gap timer that determines the length of an acceptable interruption (e.g. less than one second, or 2 to 10 seconds) and causes the wash display to flash. The length of the acceptable interruption may also be referred to as a predetermined gap interval. The predetermined gap interval may be similar to the length of the acceptable interruption. Next block 728 determines whether scrubbing has resumed and, if it has, the wash timer is restarted at block 730 and blocks 720 and 722 are repeated until the timer expires without any unacceptable interruptions, or gaps in the hand-washing sequence.

If, at block 728, scrubbing motion is not detected, block 732 determines whether the interruption timer has expired. If it has, a failed hand-washing operation is recorded and reported at block 734. If the interruption timer has not expired at block 732, blocks 728 and 732 are executed until the timer expires or scrubbing resumes.

In the method described with reference to FIG. 8A, the controller 106 monitors only the washing operation. It does not determine whether the worker has rinsed and dried her hands. A system that monitors the rinsing and drying operation replaces block 724 of FIG. 8A with the flow-chart shown in FIG. 8B. In this system, when a successful washing operation is detected, the controller 106 executes block 750 that prompts the worker to rinse and sets a rinse timer. At block 752, the controller 106 then determines whether a scrubbing motion consistent with the worker rinsing her hands is detected by the motion sensor 104, 104' or 104". If no scrubbing motion is detected, the controller repeats blocks 752 and 760 until the rinsing motion is detected or the timer expires.

Once the rinsing motion is detected, the controller 106 prompts the user to dry her hands and sets a dry timer. This prompt may involve displaying a prompt, such as the word "DRY" (not shown) on the display 121 or it may involve lighting the LED 124 in the towel dispenser sensor 122. At block 756, the controller 106 then determines whether motion is detected by the towel dispenser sensor 122. If no motion is detected, the controller repeats blocks 756 and 764 until the rinsing motion is detected or the timer expires. When motion is detected by the towel dispenser sensor 122, the controller records and reports a successful hand-washing operation at block 758.

Although the example system is described as using a towel dispenser, it is contemplated that a blow dryer (not shown) or other non-contact drying system may be used instead. In this example system, the motion sensor of the blow dryer may be monitored to ensure that the worker's hands are sufficiently dry. Alternatively, the microphone 126 may listen for the audio signature of the blow dryer to ensure that it is used for a sufficient amount of time to dry the worker's hands.

If, at block 760 or 764, no motion is detected when the timer expires, the system records and reports a failed hand-washing operation at block 762. It is contemplated, however, that at block 762, rather than reporting a failed hand-washing operation, the controller may record and report the washing operation as being successful but report a failed rinsing or drying operation, as appropriate.

As described above, the employer may be required to ensure that its workers wash their hands several times during a shift and/or immediately after an event, such as using the toilet or returning from a break. In one embodiment, the schedule for each worker may be maintained by the controller 106. In another embodiment, it may be maintained by the remote computer and the controller may be notified when a particular worker is due for a hand-washing procedure. Upon receiving this notification, the controller 106 may display information about the particular worker, for example, her name or employee ID number on the display 121, or, alternatively, may announce the name of the employee using the optional speaker 128. It is contemplated that the controller 106 may use other methods, such as a short-range radio transmission to a headset or a text message to the worker's mobile device to remind the worker that the washing operation is due.

Figure 9A:
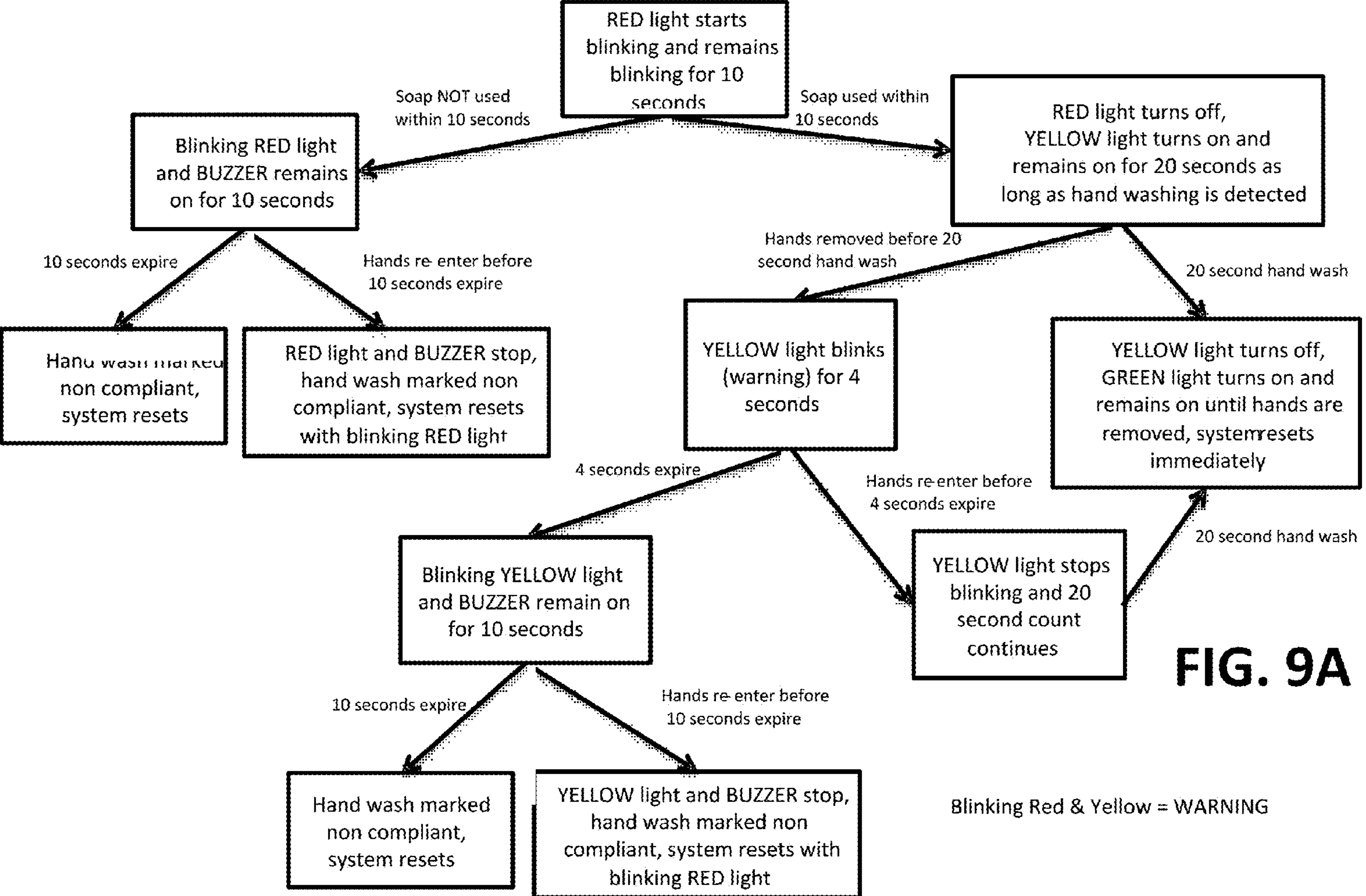
FIGS. 9A and 9B are flow-chart diagrams that describe examples of hand-washing operations where the worker rinses before applying soap and does not rinse before applying soap, respectively.
Figure 9B:
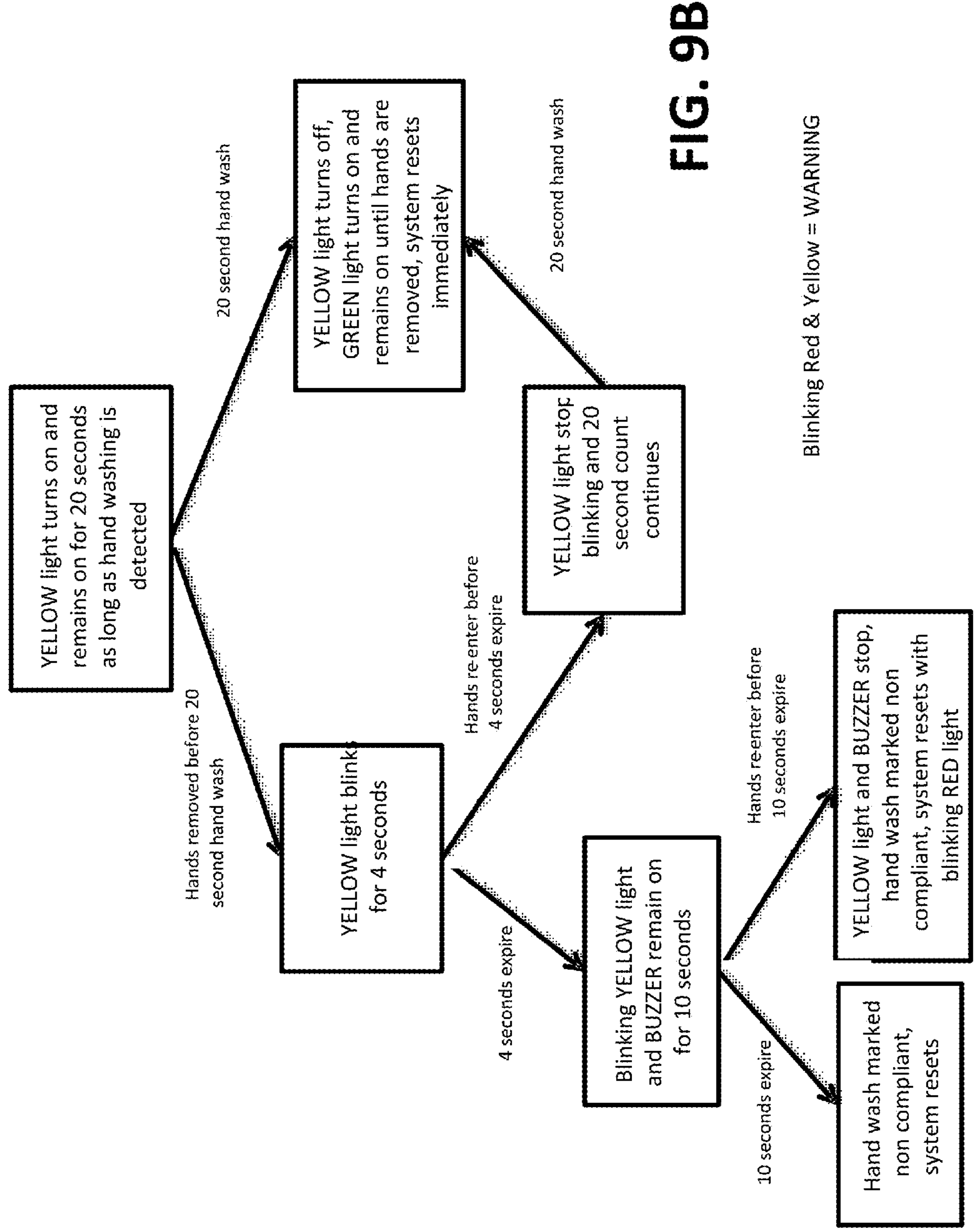
Figure 9C:
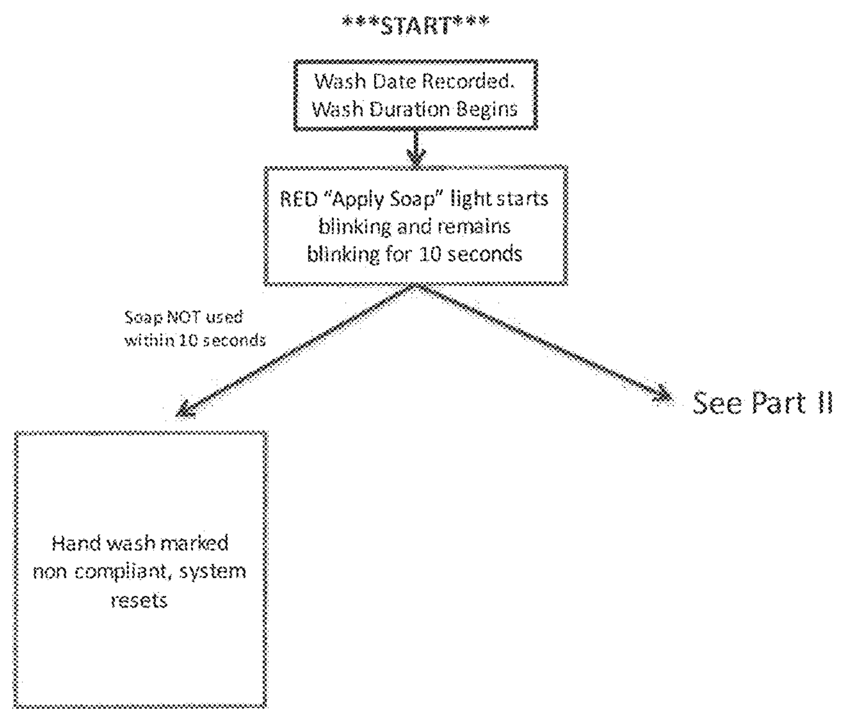
FIGS. 9C, 9D and 9E are alternative flow-chart diagrams that describe example hand-washing operations where the worker rinses before applying soap and does not rinse before applying soap, respectively.
Figure 9D:
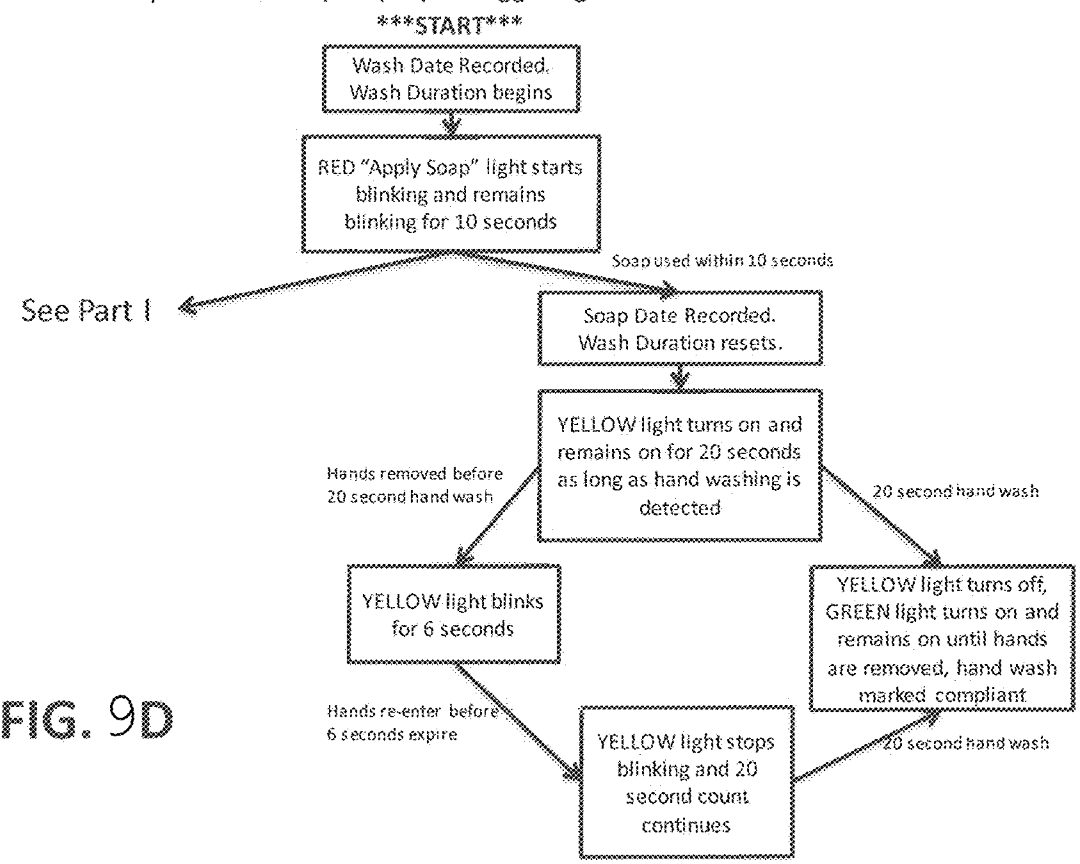
Figure 9E:
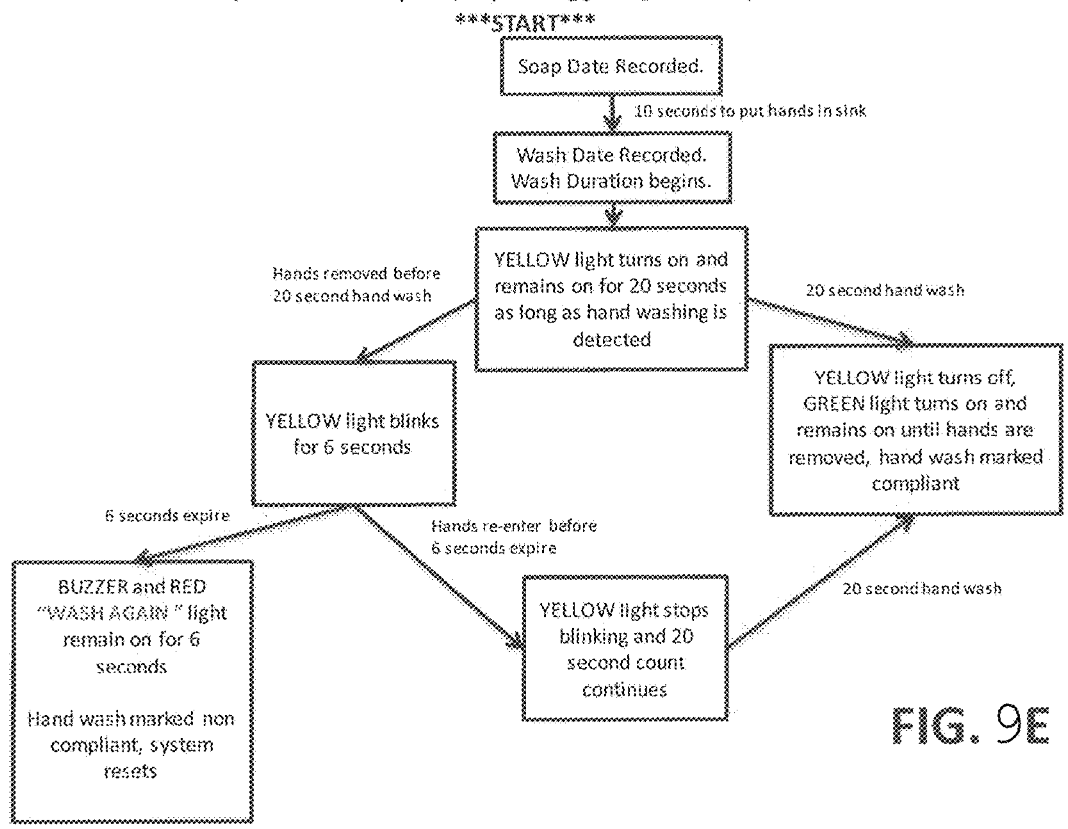

FIG. 9A is a flow-chart diagram that shows a sequence of operations when the worker wets her hands before applying soap and FIG. 9B shows a similar sequence of operations when the worker does not wet her hands before applying soap. These flow-charts describe a system that uses the optional buzzer 510 in the display 108 or 121 and that uses multi-color LEDs in the displays and, optionally, in the soap and towel dispenser sensors. These flow-charts are self-explanatory. FIGS. 9C, 9D and 9E show an alternative sequence of operations to implement a hand washing protocol.

Figure 10A:
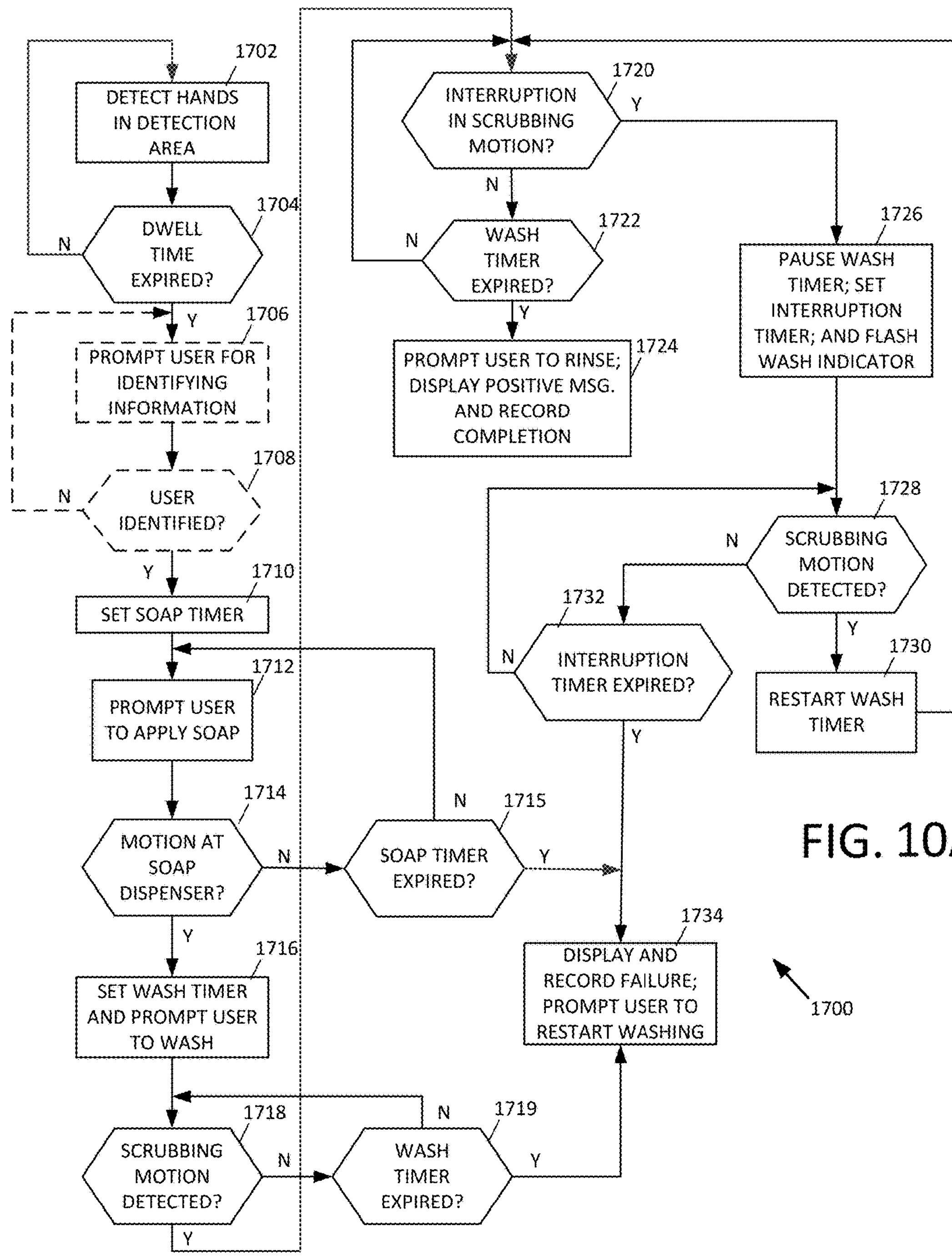
FIGS. 10A and 10B are flow-chart diagrams that are useful for describing the operation of the examples of a hand-washing monitor such as those shown in FIGS. 7A and 7B.
Figure 10B:
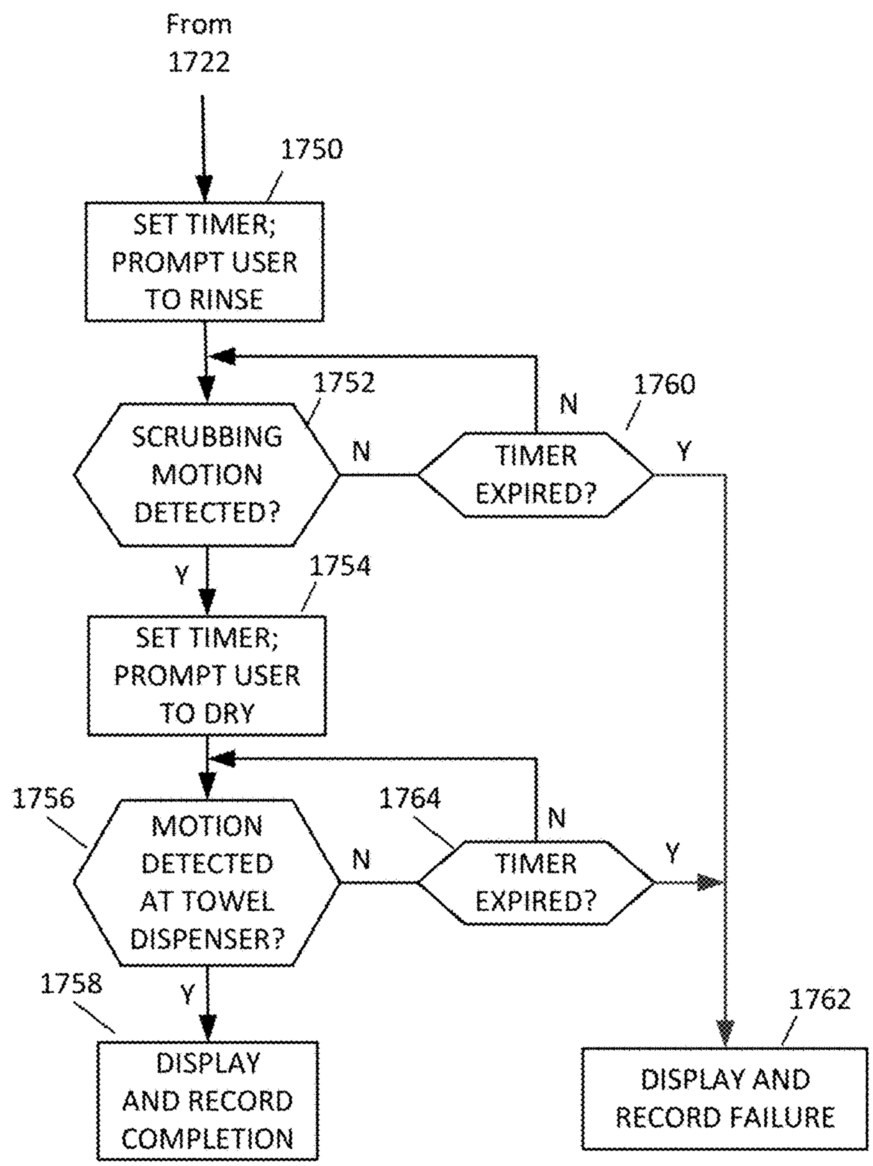

FIGS. 10A and 10B are flow-chart diagrams that are useful for describing the operation of the examples of a hand-washing monitor such as those shown in FIGS. 7A and 7B.

As described below, the controller 1066 of FIG. 7A controls the display 1110, proximity sensor 1044 and the motion detector 1260 to implement a prompt to a worker to perform a hand-washing sequence, and to monitor the adherence of the worker to the hand-washing sequence or protocol.

At block 1702 of FIG. 10, the process begins when the controller 1066 detects hands in the sink 1000 using one of the motion detector 1260. To ensure that the detection is not a spurious event, the controller 1066, at block 1704, may monitor the motion detector 1260 for the presence of the hands for a dwell time, for example, of 1 to 3 seconds, 0.5 to 5 seconds, 0.5 to 4 seconds or the like. Once the dwell timer has expired, the process 1700 optionally transfers to block 1706 in which the controller 1066, using the optional display 1210 or the speaker 1280, prompts the worker to provide identifying information. In a more particular example, the worker may state her name, which is received, for example, via the microphone 1260 of FIG. 7A, and recognized by the controller 1066, or by a remote computer, running a voice-recognition algorithm. It is contemplated, however, that other types of biometric identification may be used, such as fingerprint detection, facial detection, iris recognition, or retinal scan. Alternatively non-biometric methods may be used, such as having workers touch their names on an input device (not shown) to initiate the hand-washing operation, swiping a badge near a radio frequency identification (RFID) device, or the like.

When the worker is identified at optional block 1708, the controller 1066, at block 1710, sets a soap timer that allows the worker an amount of time to apply soap. Next, at block 1712, the controller lights the LED 1113 or displays, for example, a right arrow on the display 1210 to prompt the worker to apply soap. At block 1714, the controller 1066 determines whether the proximity sensor 1144 has detected the presence of a hand in the proximity of the soap dispenser 1180. If the hand is not detected, block 1715 determines whether the soap timer has expired. If it has, control transfers to block 1734 to record and report a failed hand-washing operation for the identified worker. If, at block 1715, the soap timer has not expired, the controller repeats blocks 1712 and 1714 until the application of soap is detected.

Next, at block 1716, the controller 1066 sets the wash timer and prompts the worker to scrub her hands. At block 1718 the controller checks the signal from the motion 1260 to determine whether the worker is scrubbing her hands. If no motion is detected, block 1719 determines whether the wash timer has expired. If it has, the controller 1066 records and reports a failed hand-washing operation for the worker at block 1734. If the wash timer has not expired, the controller 1066 repeats block 1718 until motion is detected or the timer expires.

When motion is detected blocks 1720 and 1722 continually monitor the motion detector 1260 to detect intervals in which the scrubbing motion is interrupted. If the scrubbing motion is detected until the wash timer expires, the system, at block 1724, prompts the worker to rinse and dry her hands and reports a successful hand-washing operation for the identified worker.

If an interruption, or gap, is detected, block 1726 pauses the wash timer, sets an interruption or gap timer that determines the length of an acceptable interruption (e.g. less than one second, 2 to 10 seconds, or the like) and causes the wash display to flash. The length of the acceptable interruption may also be referred to as a predetermined gap interval. The predetermined gap interval may be similar to the length of the acceptable interruption. Next block 1728 determines whether scrubbing has resumed and, if it has, the wash timer is restarted at block 1730 and blocks 1720 and 1722 are repeated until the timer expires without any unacceptable interruptions, or gaps in the hand-washing sequence.

If, at block 1728, scrubbing motion is not detected, block 1732 determines whether the interruption timer has expired. If it has, a failed hand-washing operation is recorded and reported at block 1734. If the interruption timer has not expired at block 1732, blocks 1728 and 1732 are executed until the timer expires or scrubbing resumes.

In the method described with reference to FIG. 10, the controller 1066 monitors only the washing operation. It does not determine whether the worker has rinsed and dried her hands. A system that monitors the rinsing and drying operation replaces block 1724 of FIG. 10A with the flow-chart shown in FIG. 10B, which was described above. In this system, when a successful washing operation is detected, the controller 1066 executes block 1750 that prompts the worker to rinse and sets a rinse timer. At block 1752, the controller 1066 then determines whether a scrubbing motion consistent with the worker rinsing her hands is detected by the motion sensor 1260. If no scrubbing motion is detected, the controller repeats blocks 1752 and 1760 until the rinsing motion is detected or the timer expires. At which time, a positive message (e.g., "good job") indicator light, such as 1119 of FIG. 7A may be illuminated to provide positive feedback to the user.

Once the rinsing motion is detected, the controller 1066 prompts the user to dry her hands and sets a dry timer. This prompt may involve displaying a prompt, such as the word "DRY" (not shown) on the display 1210, or it may involve lighting an LED (not shown in this example) in the towel dispenser sensor 1220. At block 1756, the controller 1066 then determines whether motion is detected by the towel dispenser sensor 1220. If no motion is detected, the controller repeats blocks 1756 and 1764 until the rinsing motion is detected or the timer expires. When motion is detected by the towel dispenser sensor 1220, the controller records and reports a successful hand-washing operation at block 1758.

If, at block 1760 or 1764, no motion is detected when the timer expires, the system records and reports a failed hand-washing operation at block 1762. It is contemplated, however, that at block 1762, rather than reporting a failed hand-washing operation, the controller 1066 may record and report the washing operation as being successful but report a failed rinsing or drying operation, as appropriate.

Figure 11:
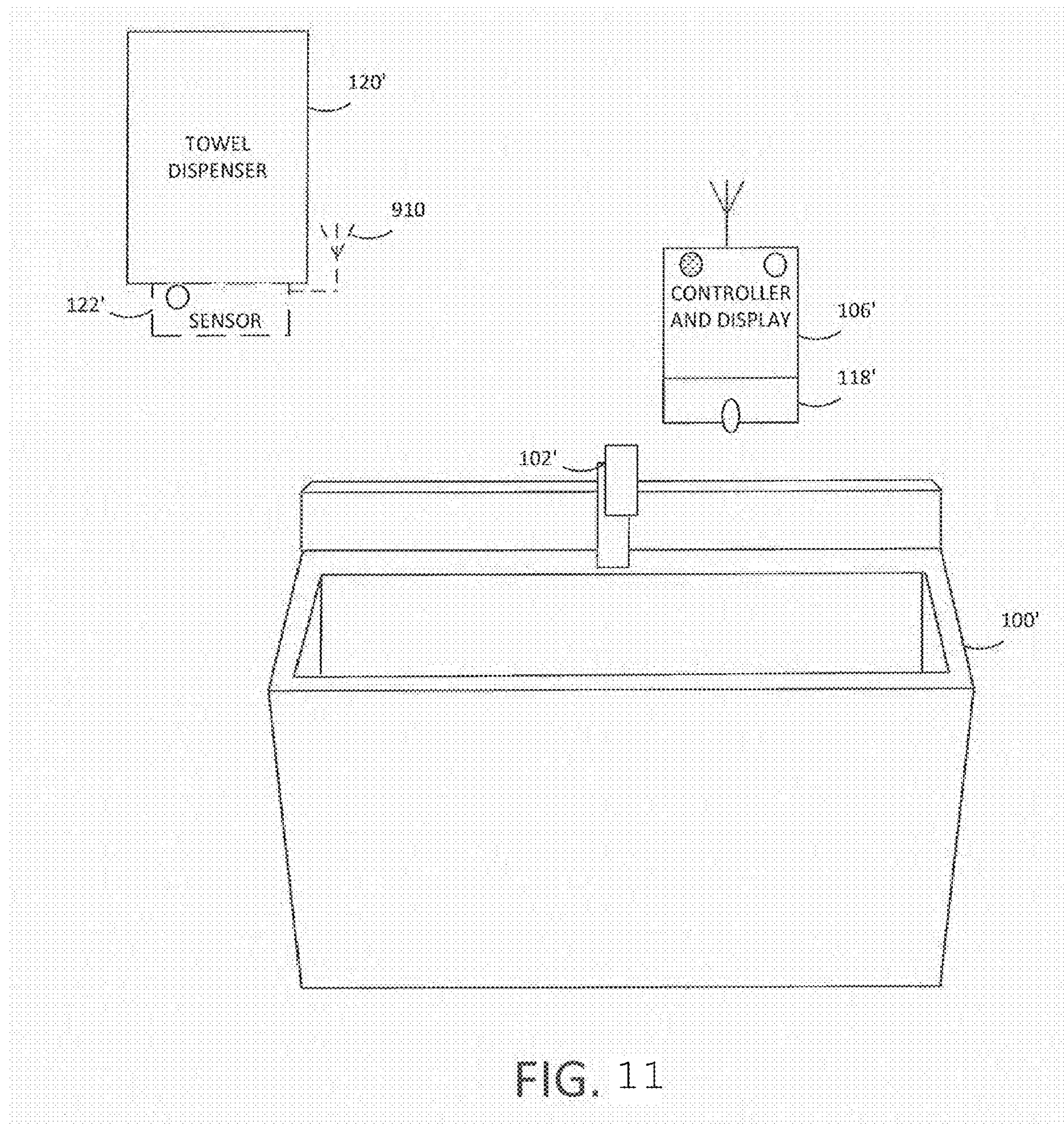
FIG. 11 is a block diagram, partly in perspective, of a sink in a food preparation establishment that includes an alternative hand-washing monitoring system.

FIGS. 11 and 12A-12D describe an alternate system in which most of the hardware is integrated into the soap dispenser. As shown in FIG. 11, the alternative soap dispenser 106' includes the controller and display. In this embodiment, the controller is mounted on the front panel of the soap dispenser and is coupled to receive operational power using a power supply that also powers the soap dispenser from the electrical wiring of the facility. The example system shown in FIG. 11 employs a touchless faucet 102'. As described below with reference to FIGS. 12A-12D, the scrubbing sensor 104''', microphone 126 and speaker 128 as well as one or more cameras 1012 and 1010 for performing facial recognition or palm recognition are also incorporated in the control unit integrated with the soap dispenser. Although FIGS. 11 and 12A-12D show the scrubbing sensor 104''' mounted on the soap dispenser, it is contemplated that it may be mounted on the sink, as described above. In this implementation, the sensor 104''' may communicate with the controller 106' by a wired or wireless communication link.

FIG. 12A shows a front plan view of an example control unit 106' integrated with the soap dispenser 118'. The example control unit includes a display 121', a speaker 128' and two cameras, 110 and 1012. The camera 1010 is configured to capture an image of the worker's hand as she obtains soap from the soap dispenser 118' and the camera 1012 is configured to obtain facial images of the worker for a facial recognition algorithm. FIG. 12A also shows example locations for the scrubbing sensor 104''' and soap dispensing valve 1014. The example dispenser 118' is motion-activated. Thus, rather than having a separate motion sensor 114, as shown in FIG. 1, the example system shown in FIG. 11 uses signals from the motion sensor that causes the dispenser 118' to dispense soap.

As shown in FIG. 11, the example system includes a towel dispenser 120 having a sensor 122. The controller 106' may include a wired connection (not shown) to the sensor 122 or may use a wireless connection. If the controller uses a wireless connection, communication with the towel dispenser sensor 122 may be through the antenna 1016 coupled to the controller 106' and the optional antenna 910 coupled to the towel dispenser sensor 122'. When a wireless connection is used, both the towel dispenser sensor 122' and the controller 106' may include a short-range communication device such as a Bluetooth, Wi-Fi, NFC, infrared or ultrasonic transceiver.

FIG. 12B shows a side-plan view of the control unit 106' and soap dispenser. As shown in FIG. 12B, the control unit 106' is mounted on a cover plate 1019 of the soap dispenser 118'. The cover plate 1019 is attached to the main body of the dispenser 118' by a hinge 1018. The hinge is configured to allow the cover plate 1019 to be rotated clockwise so that the soap bag 1034 in the soap dispenser 118' may be changed.

The control unit is configured to receive operational power from the soap dispenser 118' via a flexible conduit 1017. The conduit 1017 electrically connects the controller 106' to the power supply (not shown) of the soap dispenser 118'. In one embodiment, the power supply is connected to the electrical wiring of the building. Alternatively, the power supply of the soap dispenser may be a battery.

FIG. 12B also shows the field of view 1030 of the scrubbing sensor 104''' and the field of view 1032 of the palm recognition camera 1010. These cameras are configured with an angle of between 10 and 50 degrees, as appropriate depending on the geometries of the soap dispenser and sink. As shown, the field if view 1030 is sufficient to cover a volume in the sink in which the workers are likely to scrub their hands and the field of view 1032 is sufficient to capture an image of the worker's palm as she uses the soap dispenser to obtain soap.

FIG. 12C shows an example bottom view of the soap dispenser 118' and control unit 106'. FIG. 12C shows an example configuration of the lenses of the palm recognition camera 1010 and scrubbing sensor 104'''. It also shows the configuration of the soap valve 1014 and soap dispenser motion sensor 1040. Although FIG. 12C shows the lenses of the camera 1010 and scrubbing sensor 104''' as being recessed from the bottom of the housing of the control unit 106', it is contemplated that lenses of the camera 1010 and scrubbing sensor 104''' may be mounted so that the lenses are flush with or extend below the bottom of the housing. Alternatively, one of both of the camera 1010 and/or sensor 104''' may be recessed from the front of the housing to have a field of view extending from the front of the control unit housing. The sensor 104''' and/or camera 1010 may also be flush with or extend from the front of the control unit housing rather than being recessed in the housing.

As shown in FIG. 12A, the display 121' of the control unit 106' prompts the worker to apply soap, wash hands, rinse hands and restart. The first three steps are the same as shown in FIG. 6B and the system operates in the same way to implement that part of the hand washing protocol. The fourth step, "RESTART" is displayed when a failed hand washing operation is detected, for example, in step 734 of FIG. 8A, described above.

Alternatively, a display such as the display 121" shown in FIG. 12D may be used. This display may be used for example, in a protocol similar to that shown in FIG. 9A in which the worker is prompted to wet her hands before applying soap. Using this protocol, when the worker is detected at the wash station, the display 121" lights up the "WET HANDS" prompt and may also begin a recognition process, such as voice recognition or facial recognition. The system monitors either the motion sensor of the motion-activated faucet 102' or the scrubbing sensor 104''' to detect motion in the sink to determine whether the worker has wet her hands. Next, the system lights the "APPLY SOAP" prompt. As shown in FIG. 12B, when the worker reaches for the soap dispenser, the system may capture an image of the worker's palm using the camera 1010, This image may be used to identify the worker by comparing the image to stored images of all of the workers. This identification step may be used in place of the voice-recognition or facial-recognition processes or it may be used to confirm the results of one or both of those processes.

After the worker applies soap, the algorithm proceeds as described above with reference to FIGS. 8B and 9A with the worker being prompted via the "RESTART" prompt to begin the hand washing protocol again if a failure is detected.

Figure 13:
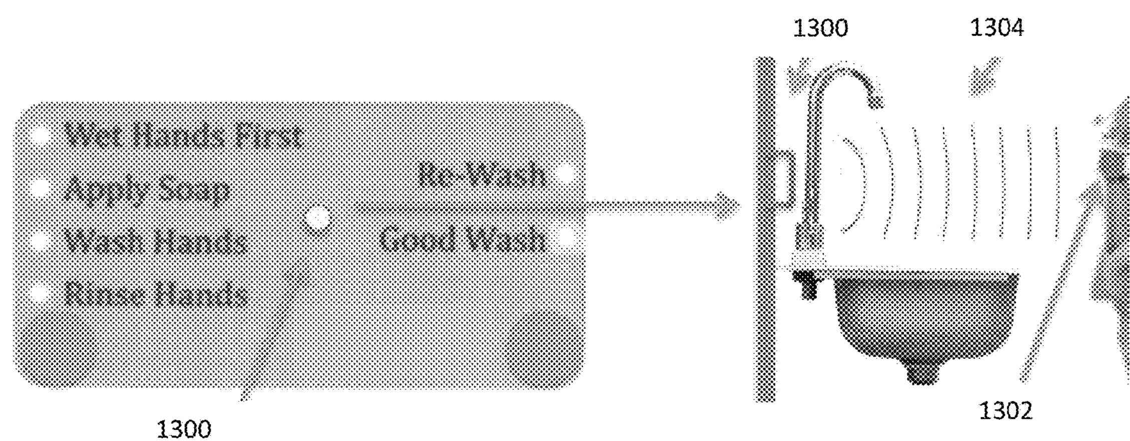
FIG. 13 is a schematic view of a smart button device that interacts with the hand-washing monitoring system, according to one or more embodiments shown and described herein.

In an embodiment, the optional screen-type display 121 of FIG. 1 may include a display screen 1300 as shown in FIG. 13 as a component of a hand-washing monitoring system embodiment that is communicatively coupled to the controller 106. In FIG. 13, the display screen 1300 is positioned behind the faucet 102 of the sink 100 to face a user and interact with a smart button device 1302 worn by a user. The smart button device 1302 may interact with one or more components of the monitoring system installed on a sink 100 through use of wireless communication, such as transmission of infrared data packets between sensors installed in the smart button device 1302 and the monitoring system components. The controller 106 may be configured to track a particular user's handwashing analytics, including length of a handwashing, and provide alerts as needed based on this interaction with the smart button device 1302. The smart button device 1302 may include a light display such as an LED display that is configured to change color and/or light status (such as between solid or blinking) according to programmed system rules.

By way of example, and not as a limitation, at the beginning of a workday, the smart button device 1302 may be turned on and may display a start color or negative indication color indicative of a need for handwashing, such as a red color. The smart button device 1302 may include a unique identifier and be associated with a particular user such that data analytics particular to a user may be tracked and analyzed by the system. A user may wash his or her hands at a sink 100 such that the smart button device 1302 interacts with the monitoring system installed on the sink 100 to confirm the handwashing and turn the smart button a positive indication color to indicate a complete handwashing, such as green. In an example, when the monitoring system detects that a good, complete handwashing has been conducted, the monitoring system may be configured to light an LED associated with a "Good Wash" option on the display screen 1300 and transmit sounds waves 1304 to the smart button device 1302 to turn the smart button device 1302 worn by the user the positive indication color (such as green).

The display screen 1300 of FIG. 13 includes a plurality of options that may be displayed to a user through use of an associated indicator light to instruct the user through the handwashing process and track user analytics when interacting with the smart button device 1302. For example, the monitoring system may be configured to use the Internet of Things and big data analytic systems to coach, enforce, verify, and reward proper handwashing by employees. A user wearing the smart button device 1302 may approach the sink 100, and the display screen may display a light associated with a "Wet Hands First" option until the system senses that the user has wet his or her hands as described herein. A light associated with an "Apply Soap" option may then be lit until the system senses that the user has applied soap as described herein. Next, a light associated with a "Wash Hands" option is lit until the system senses that the user has washed his or her hands for a predetermined amount of time, such as through sensing a scrubbing motion, to indicate a thorough washing. A light associated with a "Rinse Hands" option is then lit until the system senses that the user has adequately rinsed his or her hands for a sufficient amount of time. After the Rinse Hands light turns off, and the handwashing has been completely appropriately, the light associated with the "Good Wash" feature will turn on to indicate a good handwashing. The system may then interact with the smart button device 1302 to turn a light indicator such as an LED associated with the device 1302 into a positive indication color such as green, for example. The positive indication color indicates that the user has completed a good handwashing, and the system is configured to record the analytics associated with the handwashing as well as to non-compliant handwashing that are specific to the user and the smart button device 1302.

After the light associated with the Good Wash feature turns on, the user may stop the handwashing and dry or continue to wash his or her hands. If during the process the system detects non-compliance with the handwashing process by the user, a light associated with a "Re-Wash" feature on the display screen 1300 may be turned on with a negative indication color, such as red.

In embodiments, the smart button device 1302 may be configured to have a three foot detection range such that the smart button device 1302 may interact with the monitoring system installed on a sink 100 when a user is standing within three feet of the sink 100.

In an embodiment, users may be required to wash hands during a periodic cycle, such as once an hour. The smart button device 1302 may be configured to stay a positive indication color and light status such as solid green for 55 minutes of the hour, then be configured to blink and/or turn an intermediate color such as yellow or amber for 10 minutes to allow a user to wash his or her hands, and then may be configured to turn to a negative indication color and light status of solid red if the user does not complete a good handwashing. Upon turning to red, the smart button device 1302 may be configured to send an automatic alert to a supervisor such that the employee may be instructed to wash his or her hands immediately.

In another embodiment, at the beginning of the workday, a user may locate his or her smart button device 1302 at a charging station, wear and turn on the smart button device 1302, which may display a starting negative indication color, such as red, and the employee is required to complete a "Good Wash" before the smart button device 1302 turns the positive indication color (such as green). Electronic sensors of the monitoring system positioned at the sink 100 are configured to read the smart button device 1302 within a three feet range and are configured to sense hands in the sink 100 and at the soap dispenser 118 as described herein. After a "Good Wash" indication on the display screen 1300, the smart button device 1302 may turn a solid positive indication color (such as green) for a predetermined amount of time, which may be, for example, 50 minutes. After the predetermined amount of time, the smart button device 1302 may be configured to change light status from solid to blinking (green or another color) for a blinking period, such as for 10 minutes, alerting the user that a "Good Wash" is needed within the blinking period (i.e., a predetermined action period). Upon the employee failing to achieve this "Good Wash" in the blinking period, the smart button device 1302 may be configured to turn a solid negative indication color (such as red) until a "Good Wash" is completed. Alerts may be sent out to supervisors and the like when the smart button device 1302 displays the solid negative indication color such that the supervisor may take corrective action. Data analytics specific to the user may be collected as well to determine whether the user habitually fails to obtain a "Good Wash" or is a sanitary user actively engaged with following proper handwashing procedures.

The smart button device 1302 may be rechargeable, utilize wireless charging technology, and be charged in a charging station. The charging station may be designed to house and recharge multiple smart button devices 1302 simultaneously. Placement of a smart button device 1302 in the charging station may begin the charging cycle, and the smart button device 1302 may be configured to indicate charging status through a light display. For example, a flashing red light may indicate that the smart button device 1302 is currently charging. After a majority of charging occurs, the light color may be changed to indicate charging is nearing completion. For example, after about 80% charge completion, the smart button device 1302 may be configured to change the light display color such that, for example, a flashing amber light appears. A charge completion may be indicated by a light change to a positive indication color, such as green. Thus, after 100% charge completion, the smart button device 1302 may be configured to display through an LED a flashing green light. Thus, the smart button device 1302 may be configured to indicate a respective status via a LED indicator configured to change color and/or light status (such as either flashing or solid) during charging and use by the user. The smart button device 1302 may transmit a charge status to the system when interacting with the system at a sink 100, and the system may record the charge status for the particular smart button device 1302 as a data wash log entry.

Although the system and method are illustrated and described herein with reference to specific embodiments, neither the system nor the method is intended to be limited to the details shown. Rather, various modifications may be made in the details within the scope and range of equivalents of the claims.

The term "coupled" as used herein refers to any logical, physical or electrical connection, link or the like by which signals produced by one system element are imparted to another "coupled" element. Unless described otherwise, coupled elements or devices are not necessarily directly connected to one another and may be separated by intermediate components, elements or communication media that may modify, manipulate or carry the signals.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

What is claimed:

1. A hand-washing monitoring system comprising:

a motion detector mounted proximate a top surface of a sink and configured to detect a scrubbing motion at a location near an outlet of a faucet of the sink;

a smart button device configured to be worn by a user and interact with the motion detector, the smart button device including a light indicator configured to at least one of change color and light status;

a processor coupled to the motion detector and the smart button device; and a memory coupled to the processor, the memory including program instructions that when executed by the processor cause the processor to:

monitor the motion detector for signals indicative of the scrubbing motion that is throughout a predetermined scrubbing interval;

provide a first output signal when the scrubbing motion is continuously detected during the entire interval such that the first output signal is associated with a positive detection determination;

transmit the first output signal to the smart button device; and set the light indicator of the smart button device to a positive indication color to indicate the positive detection determination.

2. The hand washing monitoring system of claim 1, wherein the scrubbing interval is between 15 seconds and 40 seconds.

3. The hand washing monitoring system of claim 1, wherein:

the motion detector includes a pyroelectric infrared (PIR) motion detector that is configured to detect the scrubbing motion by detecting changes in IR signals having frequencies consistent with the scrubbing motion.

4. The hand washing monitoring system of claim 3, wherein the infrared motion detector includes a Fresnel lens configured to have a predetermined field of view that encompasses an area beneath the faucet outlet and extending into the sink.

5. The hand washing monitoring system of claim 1 wherein the sink further comprises a faucet and the program instructions further cause the processor to monitor the motion detector for signals indicative of an object moving under the faucet after the predetermined scrubbing interval and before providing the first output signal.

6. The hand washing monitoring system of claim 5 further comprising:

a proximity detector mounted proximate to a soap dispenser;

wherein the program instructions when executed by the processor further cause the processor to monitor the proximity detector for signals indicative of application of soap to an object prior to monitoring the motion detector for the signals indicative of the scrubbing motion.

7. The hand washing monitoring system of claim 6, wherein the proximity detector mounted proximate to the soap dispenser is positioned farther away from the faucet than the motion detector.

8. The hand washing monitoring system of claim 6, further comprising:

a further proximity detector mounted proximate to a towel dispenser;

wherein the program instructions when executed by the processor further cause the processor to monitor the further proximity detector for signals indicative of the dispensing of a towel, after monitoring the motion detector for the signals indicative of the object moving under the faucet and before providing the first output signal.

9. The hand washing monitoring system of claim 8, further comprising:

at least one display device coupled to the processor;

wherein the program instructions when executed by the processor further cause the processor to control the display device to:

display a first prompt for a user to place the user's hands under the soap dispenser before monitoring proximity detector;

display a second prompt for the user to scrub the user's hands in the sink before monitoring the proximity detector for the signals indicative of the scrubbing motion;

display a third prompt for the user to place the user's hands under the faucet before monitoring the motion detector for the signals indicative of the object moving under the faucet; and display a fourth prompt for the user to take a towel from the towel dispenser before monitoring the further proximity detector for signals indicative of the dispensing of the towel.

10. The hand washing monitoring system of claim 8, wherein the program instructions when executed by the processor further cause the processor to display an indication of a non-compliant hand washing such that a second output signal indicating a non-compliant hand washing is sent to the smart button device to prevent the light indicator from being set to the positive indication color when:

the processor does not detect the signals indicative of the application of the soap to the object after a first predetermined time following the display of the first prompt;

the processor does not detect the signals indicative of the scrubbing motion after a second predetermined time following the display of the second prompt;

the processor does not detect the signals indicative of the object moving under the faucet after a third predetermined time following the third prompt; or the processor does not detect the signals indicative of the dispensing of the towel after a third predetermined time following the display of the fourth prompt.

11. The hand washing monitoring system of claim 1, wherein the program instructions when executed by the processor cause the processor to:

provide a second output signal, different from the first output signal, when the signals provided by the motion detector do not indicate a scrubbing motion throughout the predetermined scrubbing interval such that the second output signal is associated with a negative detection determination;

transmit the second output signal to the smart button device; and set the light indicator of the smart button device to a negative indication color to indicate the negative detection determination, wherein the positive indication color is green and the negative indication color is red.

12. The hand washing monitoring system of claim 1, wherein the program instructions when executed by the processor cause the processor to delay the detection of the scrubbing motion for a predetermined dwell interval following detection of motion by the motion detector.

13. The hand washing monitoring system of claim 12, wherein the predetermined dwell interval is between 0.5 seconds and 5 seconds.

14. The hand washing monitoring system of claim 1, wherein the program instructions when executed by the processor cause the processor to detect the scrubbing motion when no gaps greater than a predetermined gap interval are detected during the scrubbing interval.

15. The hand washing monitoring system of claim 14, wherein the gap interval is less than one second.

16. The hand washing monitoring system of claim 1, wherein the smart button device is associated with a unique identifier, the positive indication color is green, a positive solid light status is associated with the positive indication color, and the smart button device is configured to change from green to an intermediate mode comprising at least one of a negative blinking light status and an alert indication color of yellow or amber after a predetermined periodic cycle based on the first output signal not being transmitted during the predetermined periodic cycle.

17. The hand-washing monitoring system of claim 16, wherein the smart button device is configured to change from the intermediate mode to a negative solid light status and a negative indication color of red after a predetermined action period based on the first output signal not being transmitted during the predetermined action period.

18. The hand-washing monitoring system of claim 1, wherein the motion detector is mounted to the top of the sink.

19. The hand-washing monitoring system of claim 18, wherein the motion detector includes a rangefinder and is mounted on top of a back edge of the sink, proximate to the faucet.

20. The hand-washing monitoring system of claim 18, wherein the motion detector is mounted on top of a front edge of the sink at an angle such that a center of a field of view of the sensor is above the top of the sink and below the outlet of the faucet.

21. The hand-washing monitoring system of claim 1, wherein the motion detector is mounted through the front wall of the sink.

22. The hand-washing monitoring system of claim 1, wherein program instructions when executed by the processor further cause the processor to periodically prompt a user to perform a hand-washing operation through changing the smart button device to an intermediate mode comprising at least one of a negative blinking light status and an alert indication color of yellow or amber after a predetermined periodic cycle based on the first output signal not being transmitted during the predetermined periodic cycle.

23. The hand washing monitoring system of claim 1, wherein the motion detector comprises:

an emitter located on a first side of the faucet, the emitter oriented to emit infrared light toward an area in front of the faucet where the scrubbing motion is to take place; and a receiver located on a second side of the faucet and positioned to detect infrared signals indicative of the scrubbing motion throughout the interval that occurs in the area in front of the faucet.

24. The hand washing monitoring system of claim 23, wherein:

the emitter is configured to emit an infrared light beam to an area in the field of view of the receiver; and the receiver is configured to detect in the field of view reflections of the infrared light beam emitted by the emitter that are indicative of heat and motion of the scrubbing motion throughout the interval in the receiver's field of view.

25. The hand washing monitoring system of claim 24, wherein the infrared light output from the emitter is modulated to be uniquely detected by the detector.

26. A hand-washing monitoring system for use with a sink having a faucet and a soap dispenser comprising:

a motion detector mounted to the sink and configured to detect a scrubbing motion near an outlet of the faucet;

a proximity detector mounted proximate to the soap dispenser and configured to detect application of soap to an object;

a smart button device configured to be worn by a user and interact with the motion detector and the proximity detector, the smart button device including a light indicator configured to at least one of change color and light status;

one or more display devices;

a processor coupled to the motion detector, the proximity detector, the smart button device, and the one or more display devices; and a memory coupled to the processor, the memory including program instructions that cause the processor to:

display, using one of the one or more display devices, a first prompt to place hands under the faucet;

monitor the motion detector for signals indicative of the presence of the hands beneath the faucet;

display, using one of the one or more display devices, a second prompt to apply soap to the hands;

monitor the proximity detector for signals indicative of the application of soap to the hands;

display, using one of the one or more display devices, a third prompt to scrub hands;

monitor the motion detector for signals indicative of the scrubbing motion for a predetermined interval;

display, using one of the one or more display devices, a fourth prompt to rinse the hands after the predetermined interval;

monitor the motion detector for the signals indicative of the presence of the hands beneath the faucet;

display a fifth prompt, using one of the one or more display devices, indicating completion of the hand washing;

transmit a first output signal to the smart button device associated with the display of the fifth prompt indicating completion of the hand washing; and set the light indicator of the smart button device to a positive indication color and light status to indicate completion of the hand washing for the user.

27. A smart button device for use with a hand-washing monitoring system including a monitor installed on a sink having a faucet, the smart button device configured to be worn by a user and comprising:

a housing;

a light indicator disposed on the housing and configured to at least one of change color and light status;

a processor coupled to the smart button device; and a memory coupled to the processor, the memory including program instructions that when executed by the processor cause the processor to:

adjust the light indicator from a positive indication color and a positive solid light status to an intermediate mode comprising at least one of a negative blinking light status and an alert indication color after a predetermined periodic cycle based on not receiving a prompt signal from the monitor indicative of completion of a hand washing for the user;

adjust the light indicator from the intermediate mode to a negative solid light status and a negative indication color after a predetermined action period based on not receiving a prompt signal from the monitor indicative of completion of a hand washing for the user during the predetermined action period; and adjust the light indicator from the intermediate mode to the positive indication color and the positive solid light status after the predetermined action period based on receiving a prompt signal from the monitor indicative of completion of a hand washing for the user during the predetermined action period.

28. The smart button device of claim 27, wherein the positive indication color is green, the negative indication color is red, and the alert indication color is one of yellow and amber.

* * * * *